(12) United States Patent
Gross et al.

(10) Patent No.: US 11,028,008 B2
(45) Date of Patent: Jun. 8, 2021

(54) FUSION-FORMABLE AUTOMOTIVE GLASS COMPOSITIONS, ARTICLES, AND LAMINATES

(71) Applicant: CORNING INCORPORATED, Corning, NY (US)

(72) Inventors: Timothy Michael Gross, Corning, NY (US); Lisa Anne Tietz Moore, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 741 days.

(21) Appl. No.: 15/817,958

(22) Filed: Nov. 20, 2017

(65) Prior Publication Data
US 2018/0148369 A1    May 31, 2018

Related U.S. Application Data

(60) Provisional application No. 62/427,921, filed on Nov. 30, 2016.

(51) Int. Cl.
*B32B 15/04*     (2006.01)
*B32B 17/06*     (2006.01)
(Continued)

(52) U.S. Cl.
CPC ............ *C03C 3/097* (2013.01); *B32B 17/06* (2013.01); *B32B 17/10036* (2013.01); *B32B 17/1077* (2013.01); *B32B 17/10119* (2013.01); *B32B 17/10137* (2013.01); *B32B 17/10743* (2013.01); *B32B 17/10761* (2013.01); *B32B 17/10788* (2013.01); *B60J 1/001* (2013.01); *C03C 4/18* (2013.01); *C03C 27/10* (2013.01);
(Continued)

(58) Field of Classification Search
CPC ... C03C 3/097; B32B 17/10137; B32B 17/06; B32B 17/10036
USPC .......................... 428/426, 428, 432, 688, 410
See application file for complete search history.

(56) References Cited

U.S. PATENT DOCUMENTS 3,433,611 A    3/1969   Saunders et al.
3,433,644 A    3/1969   Saunders et al.
(Continued)

OTHER PUBLICATIONS

International Searching Authority Invitation to Pay Additional Fees Partial Search Report PCT/US2017/062514 dated Feb. 13, 2018.
(Continued)

*Primary Examiner* — Lauren R Colgan

(57) ABSTRACT

Embodiments of glass articles exhibiting a sag temperature in a range from about 600° C. to about 700° C. are disclosed. In one or more embodiments, the glass article includes a glass composition including $SiO_2$ in an amount in a range from about 66 mol % to about 80 mol %, $Al_2O_3$ in an amount in a range from about 2 mol % to about 15 mol %, $B_2O_3$ in an amount in a range from about 0.9 mol % to about 15 mol %, $P_2O_5$ in a non-zero amount up to and including 7.5 mol %, $Li_2O$ in an amount from about 0.5 mol % to about 12 mol %, and $Na_2O$ in an amount from about 6 mol % to about 15 mol %. Laminates including the glass articles and methods for forming such laminates are also disclosed.

9 Claims, 10 Drawing Sheets

(51) Int. Cl.
    *C03C 3/097*     (2006.01)
    *C03C 27/10*     (2006.01)
    *B32B 17/10*     (2006.01)
    *B60J 1/00*     (2006.01)
    *C03C 4/18*     (2006.01)
    *C03B 17/06*     (2006.01)
    *C03C 21/00*     (2006.01)

(52) U.S. Cl.
    CPC ... *B32B 2309/105* (2013.01); *B32B 2605/006* (2013.01); *C03B 17/064* (2013.01); *C03C 21/002* (2013.01); *C03C 2204/00* (2013.01)

(56) References Cited

U.S. PATENT DOCUMENTS

| | | | |
|---|---|---|---|
| 6,200,137 B1 | 3/2001 | Holand et al. | |
| 6,306,784 B1 | 10/2001 | Drescher et al. | |
| 10,246,371 B1 * | 4/2019 | Dejneka | C03C 4/082 |
| 2003/0031835 A1 | 2/2003 | Seto et al. | |
| 2010/0215993 A1 * | 8/2010 | Yagi | C03C 10/0027 428/846.9 |
| 2012/0052271 A1 * | 3/2012 | Gomez | C03C 3/095 428/213 |
| 2012/0094084 A1 * | 4/2012 | Fisher | B32B 17/10761 428/174 |
| 2013/0186140 A1 * | 7/2013 | Brix | C03B 18/02 65/30.14 |
| 2014/0141217 A1 * | 5/2014 | Gulati | C03B 17/02 428/212 |
| 2015/0314571 A1 * | 11/2015 | Cites | C03C 4/18 428/215 |
| 2018/0327296 A1 * | 11/2018 | Cimo | C03C 21/00 |

OTHER PUBLICATIONS

International Search Report and Written Opinion PCT/US2017/062514 dated Apr. 10, 2018.

* cited by examiner

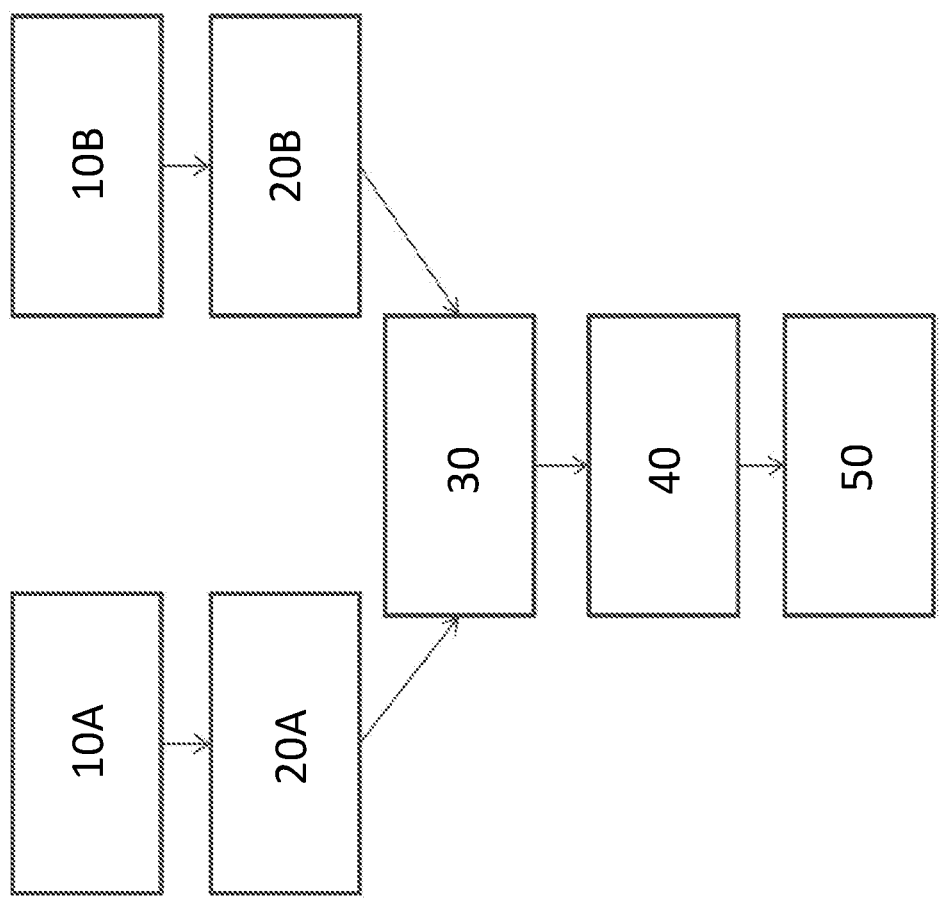

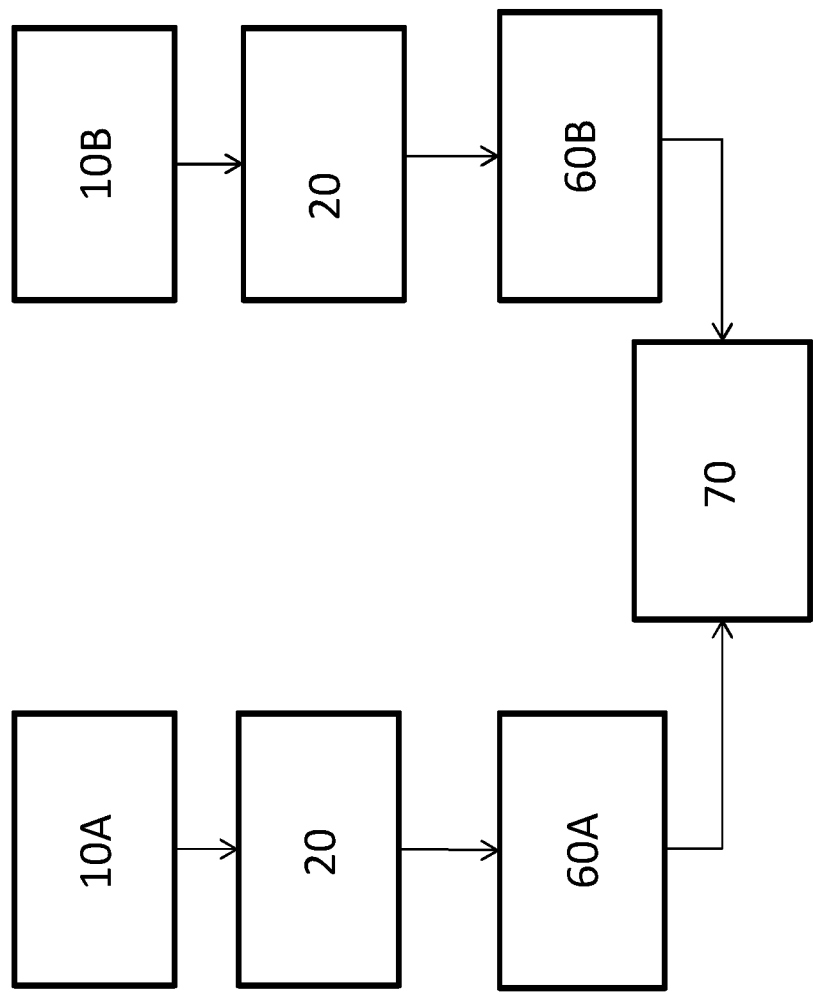

FUSION-FORMABLE AUTOMOTIVE GLASS COMPOSITIONS, ARTICLES, AND LAMINATES

CROSS-REFERENCE TO RELATED APPLICATIONS

This application claims the benefit of priority under 35 U.S.C. § 119 of U.S. Provisional Application Ser. No. 62/427,921 filed on Nov. 30, 3016, the content of which is relied upon and incorporated herein by reference in its entirety.

BACKGROUND

The disclosure relates to glass compositions and laminates, and more particularly to glass compositions and thin laminates exhibiting solar performance properties for use in automotive applications.

Glass is used in windows due to its optical clarity and durability. Automotive windows or glazing may include a single glass article (in sheet form) referred to as a monolith, or a laminate that includes two glass articles (in sheet form) with an interlayer of a polymeric material (typically polyvinyl butyral (PVB)) in between. This glazing can be used as a windshield, side lite, rear window, sunroofs and the like.

As shown in FIG. 1A, the method of making a laminated glazing includes forming two glass articles 10A, 10B (typically soda lime glass sheets made via a float process), cutting and finishing the glass articles to shape the glass articles 20A, 20B, stacking two glass articles 30, and heating the stack of glass articles to a temperature ("sag temperature") at which the glasses sag together to the desired shape (referred to as "pair sagging") 40. In one or more embodiments, the method includes forming the laminate 50 by separating the two glass articles (typically after the shaped stack is cooled), applying an interlayer between the two glass articles, and heating the three-layer stack to create the laminate. The individual soda lime glass (SLG) glass articles in this laminate construction typically have a thickness of about 1.6 mm or greater or about 2.1 mm.

There is a trend toward using lightweight laminates for windshields and other glazing to improve fuel economy. New glazing designs consisting of a thicker outer glass article and a thin inner glass article. In one construction, the thicker glass article is SLG and the thinner glass article is a strengthened glass article.

Thermal tempering is commonly used with thick, monolithic glass articles and has the advantage of creating a deep compressive layer on the glass surface, typically 21% of the overall glass thickness; however the magnitude of the compressive stress is relatively low, typically less than 100 MPa. Furthermore, thermal tempering becomes increasingly ineffective for thin glass articles (i.e., glass articles having a thickness of less than 2 mm). The standard thermal tempering process is not suitable for strengthening SLG articles having a thickness of about 3 mm thick. Moreover, SLG articles have poor chemical strengthening characteristics.

Aluminosilicate glass articles are uniquely positioned for use as the thinner glass article. In particular, aluminosilicate glasses compositions that can be formed into very thin glass articles via a fusion forming process. Moreover, aluminosilicate glass articles are well suited for chemical strengthening and can exhibit a wide range of compressive stresses (e.g., up to and even exceeding 1,000 MPa) and depths of compressive stress (e.g., up to and even exceeding 100 micrometers).

Known aluminosilicate glasses tend to exhibit high viscosity relative to SLG glass articles at the SLG sag temperature (i.e., the temperature at which SLG is typically sagged). Accordingly, this viscosity difference means the glass articles must be sagged separately, as shown in FIG. 1B, and cannot be pair sagged, which adds cost to the overall manufacturing process. In particular, FIG. 1B shows that when the glass articles cannot be pair sagged, the method by which laminate glazing is made as the same as described in FIG. 1A but includes an additional step of sagging the glass articles separately, meaning there are two sagging steps, instead of a single sagging step. Specifically, the method includes forming two glass articles 10A, 10B, cutting and finishing the glass articles to shape the glass articles 20A, 20B, in separate steps, heating each glass article to a temperature ("sag temperature") to sag the glass article the desired shape 60A, 60B, and forming the laminate 70 by stacking the glass articles with an intervening interlayer, and heating the three-layer stack to create the laminate. The method of FIG. 1B means there could be shape mismatch between the two glass articles since they are being sagged separately. Further by using two separate sagging steps, twice as much energy and time is used to sag the two glass articles.

Accordingly, there is a need for a thin glass article that can be pair sagged with SLG articles, strengthened to a sufficient degree, and is optionally, fusion-formed.

SUMMARY

This disclosure relates to glass articles having glass compositions that can be pair sagged with different glass articles (which include glass articles formed by a float process, such as SLG articles). In one or more embodiments, the glass articles are fusion formable and can be pair sagged with an SLG article. In one or more embodiments, the glass article exhibits a sag temperature in a range from about 600° C. to about 700° C. Laminates that include such glass articles and methods for forming such laminates are also disclosed.

A first aspect of this disclosure pertains to a glass article including a glass composition comprising: $SiO_2$ in an amount in a range from about 66 mol % to about 80 mol %, $Al_2O_3$ in an amount in a range from about 2 mol % to about 15 mol %, $B_2O_3$ in an amount in a range from about 0.9 mol % to about 15 mol %, $P_2O_5$ in a non-zero amount up to and including 7.5 mol %, $Li_2O$ in an amount from about 0.5 mol % to about 12 mol %, and $Na_2O$ in an amount from about 6 mol % to about 15 mol %. In one or more embodiments, the glass composition includes $SiO_2$ that is present in an amount from about 70 mol % to about 80 mol %. In some embodiments, the glass composition includes a total amount of $SiO_2$, $Al_2O_3$, $B_2O_3$ and $P_2O_5$ greater than about 88 mol %. In some instances, the glass composition comprises a compositional relationship (in mol %) of $0.9 < (Al_2O_3+P_2O_5)/(Li_2O+Na_2O) \le 1.20$. In other words, the composition relationship $(Al_2O_3+P_2O_5)/(Li_2O+Na_2O)$ is greater than 0.9 and less than or equal to 1.20. In one or more embodiments, the glass article is strengthened. In some embodiments, the glass article is fusion formed.

A second aspect of this disclosure pertains to an aluminosilicate glass article that includes a glass composition comprising $SiO_2$ in an amount of about 66 mol % or greater; and a sag temperature in a range from about 600° C. to about 700° C. or from about 650° C. to about 700° C. In one or more embodiments, the glass composition further comprises $Al_2O_3$ in an amount greater than 2 mol %. In some embodiments, the glass composition includes an alkali metal oxide selected from $Li_2O$, $Na_2O$ and $K_2O$, wherein the alkali metal oxide is present in an amount greater than about 5 mol %. In some instances, the glass composition includes a total amount of amount of alkali metal oxides ($R_2O=Li_2O+Na_2O+K_2O$) in a range from about 5 mol % to about 20 mol %. In one or more embodiments, the glass article comprises a temperature at a viscosity of 35 kilopoise of greater than about 1000° C. In some embodiments, the glass article comprises a temperature at a viscosity of 200 kilopoise of greater than about 900° C. The annealing point of the glass article according to one or more embodiments may be less than about 570°. The strain point of the glass article according to one or more embodiments may be less than about 520° C. The density of the glass article according to one or more embodiments may be about 2.5 g/cm³ or less. The glass article of one or more embodiments may have a softening point is in a range from about 725° C. and 860° C. In one or more embodiments, the glass article is strengthened. In one or more embodiments, the glass article is fusion formed.

A third aspect of this disclosure pertains to a laminate that includes an embodiment of the glass articles described herein. For example, in one or more embodiments, the laminate includes: a first glass layer, an interlayer disposed on the first glass layer, and a second glass layer disposed on the interlayer opposite the first glass layer wherein either one of or both the first glass layer and the second glass layer comprises an embodiment of the glass article. Either one of or both the first glass layer and the second glass layer may have a thickness less than about 1.6 mm. In some instances, the first glass layer comprises the glass article described herein and the second glass layer comprises a soda lime silicate glass article. In some embodiments, the first glass layer comprises a thickness of less than about 1.6 mm, and the second glass layer comprises a thickness of 1.6 or greater.

A fourth aspect of this disclosure pertains to a vehicle including a body defining an interior and an opening in communication with the interior, a glass article disposed in the opening, the article comprising a difference between the annealing point (° C.) and the softening point (° C.) of greater than about 150° C.

A fifth aspect of this disclosure pertains to a method for forming a laminate comprising: stacking a first glass article as described herein, and a second glass article having a different composition from the first glass article to form a stack, wherein the first glass layer comprises a first surface and an second surface that opposes the first surface, and the second glass article comprises a third surface and a fourth surface that opposes the third surface, and wherein the second surface is adjacent to the third surface; placing the stack on a mold; heating the stack to a temperature at which the second glass article exhibits a viscosity of $10^{9.9}$ poise to form a shaped stack; and placing an interlayer between the first glass article and the second glass layer. In one or more embodiments, the shaped stack comprises a gap between the second surface and the third surface having a maximum distance of about 10 mm or less. In some embodiments, the maximum distance is about 5 mm or less or about 3 mm or less.

Unless otherwise specified, the glass compositions disclosed herein are described in mole percent (mol %) as analyzed on an oxide basis. Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1A is a process flow chart of a method of making a laminated glazing using pair sagging according to one or more embodiments;

FIG. 1B is a process flow chart of a method of making laminated glazing according to the prior art;

DETAILED DESCRIPTION

Figure 2:
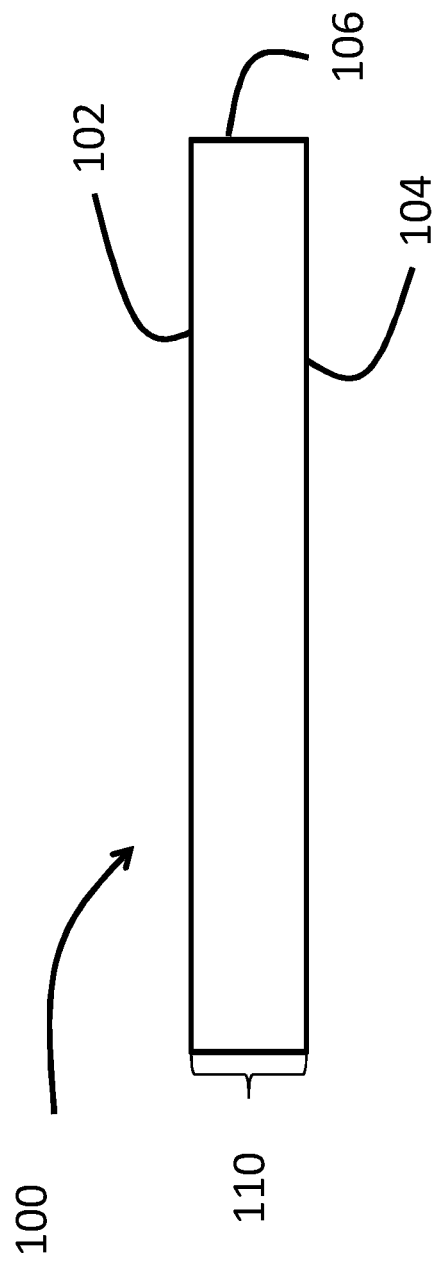
FIG. 2 is a side view illustration of a glass article according to one or more embodiments.

Reference will now be made in detail to various embodiments, examples of which are illustrated in the accompanying drawings.

Aspects of this disclosure pertain to a glass article that can be pair sagged with a different glass article that differs in any one or more of composition, thickness, strengthening level, and forming method (e.g., float formed as opposed to fusion formed). In one or more embodiments, the glass article can be fusion formed or is fusion formable meaning it can be formed using a fusion process.

In most cases automotive glazing is curved or bent, and is not flat or planar. Depending on thicknesses of the glass articles and the desired shape, the glass articles may be cold-formed (without using heat) or thermally sagged (as described herein) to achieve the curved shape.

Referring to FIG. 1A, which shows a typical thermal sagging process, two glass articles are formed as sheets 10A, 10B. The glass articles are typically formed using a float process or fusion forming process. The two glass articles are cut and finished 20A, 20B, followed by stacking 30. Prior to stacking the glass articles, a release layer is applied to facing surfaces so the glass articles do not adhere to one another during the sagging step 40. Typically, the release material is a fine talc powder. In the sagging step 40, the stack is placed on a mold and stack and mold are placed in a furnace (e.g., a box furnace, or a lehr furnace). In the furnace, the stack is heated to below the sag temperature of the glass articles and then, in the last segment of the furnace, the stack is heated at the sag temperature of the glass articles. As used herein, "sag temperature" means the temperature at which the viscosity of the glass article is about $10^{9.9}$ poise. The sag temperature is determined by fitting the Vogel-Fulcher-Tamman (VFT) equation: Log h=A+B/(T−C), where T is the temperature, A, B and C are fitting constants and h is the dynamic viscosity, to annealing point data measured using the bending beam viscosity (BBV) measurement, to softening point data measured by fiber elongation.

The heating time and temperature are selected to obtain the desired degree of sagging and final shape. Subsequently, the glass articles are removed from the furnace and cooled. The two glass articles are then separated, re-assembled with an interlayer between the glass articles and heated under vacuum to seal the glass articles and interlayer together 50.

Sagging the two glass articles together as shown in step 40 of FIG. 1A streamlines the manufacturing process; however, when the glass articles have different sag temperatures, pair sagging becomes a challenge. For example, known aluminosilicate glasses have a sag temperature that is more than 80° C. greater than the sag temperature of SLG. Moreover, some aluminosilicate glasses have viscosities that are more than 200 times greater than the viscosity of typical SLG at their respective sag temperatures.

A first aspect of this disclosure pertains to a glass article that can be pair sagged with another glass article that differs in any one or more of composition, thickness, strengthening level, and forming method (e.g., float formed as opposed to fusion formed). In one or more embodiments, the glass article described has a sag temperature of about 710° C. or less or about 700° C. or less. In or more embodiments, the glass article described herein may be pair sagged with a SLG article. In one or more embodiments, this glass article comprises a glass composition comprising $SiO_2$ in an amount in the range from about 68 mol % to about 80 mol %, $Al_2O_3$ in an amount in a range from about 2 mol % to about 15 mol %, $B_2O_3$ in an amount in a range from about 0.9 mol % to about 15 mol %; a non-zero amount of $P_2O_5$ up to and including about 7.5 mol %, $Li_2O$ in an amount in a range from about 0.5 mol % to about 12 mol %, and $Na_2O$ in an amount in a range from about 6 mol % to about 15 mol %.

A second aspect of this disclosure pertains to an aluminosilicate glass article comprising: a glass composition comprising $SiO_2$ in an amount of about 68 mol % or greater; and a sag temperature in a range from about 600° C. to about 710° C. (as defined herein).

In one or more embodiments, the glass composition includes $SiO_2$ in an amount in the range from about 68 mol % to about 80 mol %, from about 69 mol % to about 80 mol %, from about 70 mol % to about 80 mol %, from about 71 mol % to about 80 mol %, from about 72 mol % to about 80 mol %, from about 73 mol % to about 80 mol %, from about 74 mol % to about 80 mol %, from about 75 mol % to about 80 mol %, from about 68 mol % to about 79 mol %, from about 68 mol % to about 78 mol %, from about 68 mol % to about 77 mol %, from about 68 mol % to about 76 mol %, from about 68 mol % to about 75 mol %, from about 68 mol % to about 74 mol %, from about 68 mol % to about 73 mol %, or from about 68 mol % to about 72 mol %, and all ranges and sub-ranges therebetween.

In one or more embodiments, the glass composition includes $Al_2O_3$ in an amount greater than about 2 mol %, greater than about 4 mol %, or greater than about 5 mol %.

In one or more embodiments, the glass composition includes $Al_2O_3$ in a range from greater than about 2 mol % to about 15 mol %, from greater than about 2 mol % to about 14 mol %, from about 2 mol % to about 13 mol %, from about 2 mol % to about 12 mol %, from about 2 mol % to about 11 mol %, from about 2 mol % to about 10 mol %, from about 2 mol % to about 9 mol %, from about 3 mol % to about 15 mol %, from 4 mol % to about 15 mol %, from about 5 mol % to about 15 mol %, from about 6 mol % to about 15 mol %, from about 7 mol % to about 15 mol %, from about 8 mol % to about 15 mol %, from about 9 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not SLG. In this regard, the glass composition or article formed therefrom includes $Al_2O_3$ in an amount of from about 2 mol % or greater, from about 2.25 mol % or greater, from about 2.5 mol % or greater, from about 2.75 mol % or greater, or from about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 15 mol %, from about 0 mol % to about 14 mol %, from about 0 mol % to about 12 mol %, from about 0 mol % to about 10 mol %, from about 0 mol % to about 8 mol %, from about 0 mol % to about 7 mol %, from about 0.1 mol % to about 15 mol %, from about 0.1 mol % to about 14 mol %, from about 0.1 mol % to about 12 mol %, from about 0.1 mol % to about 10 mol %, from about 0.1 mol % to about 8 mol %, from about 0.1 mol % to about 7 mol %, from about 0.9 mol % to about 15 mol %, from about 0.9 mol % to about 14 mol %, from about 0.9 mol % to about 12 mol %, from about 0.9 mol % to about 10 mol %, from about 0.9 mol % to about 8 mol %, from about 0.9 mol % to about 7 mol %, from about 1 mol % to about 15 mol %, from about 2 mol % to about 15 mol %, from about 4 mol % to about 15 mol %, from about 5 mol % to about 15 mol %, from about 6 mol % to about 15 mol %, from about 7 mol % to about 15 mol %, or from about 6 mol % to about 9.5 mol %, and all ranges and sub-ranges therebetween.

In one or more embodiments, the glass composition comprises $P_2O_5$ (e.g., about 0.01 mol % or greater). In one or more embodiments, the glass composition comprises a non-zero amount of $P_2O_5$ up to and including about 8 mol %, about 7.5 mol %, about 7 mol %, about 6 mol %, about 5 mol %, about 4 mol %, or about 3 mol %. In some embodiments, $P_2O_5$ is present in an amount in a range from about 0.5 mol % to about 8 mol %, from about 0.5 mol % to about 7.5 mol %, from about 0.5 mol % to about 7 mol %, from about 0.5 mol % to about 6.5 mol %, from about 0.5 mol % to about 6 mol %, from about 0.5 mol % to about 5 mol %, from about 0.5 mol % to about 4 mol %, from about 0.5 mol % to about 3 mol %, from about 1 mol % to about 8 mol %, from about 1 mol % to about 6 mol %, from about 1 mol % to about 4 mol %, from about 1 mol % to about 3 mol %, from about 1.5 mol % to about 3 mol %, or from about 1.5 mol % to about 2.5 mol %, and all ranges and sub-ranges therebetween. In one or more embodiments, the upper limit of $P_2O_5$ may be about 7.8 mol %, about 7.6 mol %, about 7.5 mol %, or about 7.4 mol %.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 5 mol %, greater than or equal to about 8 mol %, or greater than or equal to about 12 mol %. In some embodiments, the glass composition includes a total amount of $R_2O$ in a range from about 5 mol % to about 20 mol %, from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from about 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. As used herein, the phrase "substantially free" with respect to the components of the composition means that the component is not actively or intentionally added to the composition during initial batching, but may be present as an impurity in an amount less than about 0.001 mol %. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 5 mol % or about 8 mol % or greater.

In one or more embodiments, the glass composition comprises $Na_2O$ in an amount greater than or equal to about 5 mol %, greater than or equal to about 8 mol %, greater than or equal to about 10 mol %, or greater than or equal to about 12 mol %. In one or more embodiments, the composition includes $Na_2O$ in a range from about from about 6 mol % to about 15 mol %, from about 6 mol % to about 14 mol %, from about 6 mol % to about 13 mol %, from about 6 mol % to about 12 mol %, from about 6 mol % to about 10 mol %, from about 7 mol % to about 15 mol %, from about 8 mol % to about 15 mol %, from about 9 mol % to about 15 mol %, from about 10 mol % to about 15 mol %, from about 2 mol % to about 8 mol %, or from about 3 mol % to about 7 mol %, and all ranges and sub-ranges therebetween.

In one or more embodiments, the glass composition includes less than about 4 mol % $K_2O$, or less than about 3 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition includes $Li_2O$ in an amount greater than or equal to about 0.5 mol %, greater than or equal to about 1 mol %, greater than or equal to about 1.5 mol %, greater than or equal to about 2 mol %, or greater than or equal to about 2.5 mol %. In one or more embodiments, the composition includes $Li_2O$ in a range from about 0.5 mol % to about 12 mol %, from about 0.5 mol % to about 11 mol %, from about 0.5 mol % to about 10 mol %, from about 0.5 mol % to about 9 mol %, from about 0.5 mol % to about 8 mol %, from about 0.5 mol % to about 7 mol %, from about 0.5 mol % to about 6 mol %, from about 0.5 mol % to about 5 mol %, from about 1 mol % to about 12 mol %, from about 2 mol % to about 12 mol %, from about 3 mol % to about 12 mol %, from about 4 mol % to about 12 mol %, from about 5 mol % to about 12 mol %, from about 6 mol % to about 12 mol %, from about 1.5 mol % to about 7 mol %, from about 1.5 mol % to about 6 mol %, from about 2 mol % to about 6 mol %, or from about 2 mol % to about 5 mol %, and all ranges and sub-ranges therebetween. In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition comprises the composition relationship of the total amount of $SiO_2$, $Al_2O_3$, $B_2O_3$ and $P_2O_5$ ($SiO_2+Al_2O_3+B_2O_3+P_2O_5$) is greater than about 88 mol %. In some embodiments, the total amount of $SiO_2$, $Al_2O_3$, $B_2O_3$ and $P_2O_5$ ($SiO_2+Al_2O_3+B_2O_3+P_2O_5$) is in a range of about 88 mol % to about 93.5 mol %, from about 89 mol % to about 93.5 mol %, from about 90 mol % to about 93.5 mol %, from about 91 mol % to about 93.5 mol %, from about 92 mol % to about 93.5 mol %, from about 88 mol % to about 93 mol %, from about 88 mol % to about 92 mol %, from about 88 mol % to about 91 mol %, or from about 88 mol % to about 90 mol %.

In one or more embodiments, the glass composition comprises a compositional relationship (in mol %) of $0.9 < (Al_2O_3+P_2O_5)/(Li_2O+Na_2O) \leq 1.20$. In one or more embodiments, the compositional relationship of $(Al_2O_3+P_2O_5)/(Li_2O+Na_2O)$ may be in a range from about 0.91 to about 1.2, from about 0.92 to about 1.2, from about 0.94 to about 1.2, from about 0.95 to about 1.2, from about 0.96 to about 1.2, from about 0.98 to about 1.2, from about 1 to about 1.2, from about 1.05 to about 1.2, from greater than about 0.90 to about 1.19, from greater than about 0.90 to about 1.18, from greater than about 0.90 to about 1.17, from greater than about 0.90 to about 1.16, from greater than about 0.90 to about 1.15, from greater than about 0.90 to about 1.14, from greater than about 0.90 to about 1.13, from greater than about 0.90 to about 1.12, from greater than about 0.90 to about 1.11, from greater than about 0.90 to about 1.1, from greater than about 0.90 to about 1.09, from greater than about 0.90 to about 1.08, from greater than about 0.90 to about 1.06, from greater than about 0.90 to about 1.05, from greater than about 0.90 to about 1.04, from greater than about 0.90 to about 1.02, from greater than about 0.90 to about 1, from greater than about 0.90 to about 0.98, from greater than about 0.90 to about 0.96, or from greater than about 0.90 to about 0.95.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, or from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In some embodiments, the glass composition comprises ZnO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, or from about 0 mol % to about 0.5 mol %, and all ranges and sub-ranges therebetween.

In some embodiments, the glass composition comprises SrO in an amount in the range from about 0 mol % to about 2 mol %, from about 0 mol % to about 1.5 mol %, from about 0 mol % to about 1 mol %, from about 0.5 mol % to about 2 mol %, from about 1 mol % to about 2 mol %, or from about 1.5 mol % to about 2 mol %, and all ranges and sub-ranges therebetween.

In some embodiments, the glass composition comprises BaO in an amount in the range from about 0 mol % to about 2 mol %, from about 0 mol % to about 1.5 mol %, from about 0 mol % to about 1 mol %, from about 0.5 mol % to about 2 mol %, from about 1 mol % to about 2 mol %, or from about 1.5 mol % to about 2 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises Fe expressed as $Fe_2O_3$ in a range from about 0 mol % to about 1 mol %, from about 0 mol % to about 0.9 mol %, from about 0 mol % to about 0.8 mol %, from about 0 mol % to about 0.7 mol %, from about 0 mol % to about 0.6 mol %, from about 0 mol % to about 0.5 mol %, from about 0 mol % to about 0.4 mol %, from about 0 mol % to about 0.3 mol %, from about 0 mol % to about 0.2 mol %, 0 mol % to about 0.1 mol %, from about 0.01 mol % to about 0.9 mol %, from about 0.01 mol % to about 0.8 mol %, from about 0.01 mol % to about 0.7 mol %, from about 0.01 mol % to about 0.6 mol %, from about 0.01 mol % to about 0.5 mol %, from about 0.01 mol % to about 0.4 mol %, from about 0.01 mol % to about 0.3 mol %, from about 0.01 mol % to about 0.2 mol %, from about 0.05 mol % to about 0.1 mol %, from about 0.1 mol % to about 1 mol %, from about 0.2 mol % to about 1 mol %, from about 0.3 mol % to about 1 mol %, from about 0.4 mol % to about 1 mol %, from about 0.5 mol % to about 1 mol %, from about 0.6 mol % to about 1 mol %, from about 0.2 mol % to about 0.8 mol %, or from about 0.4 to about 0.8 mol % and all ranges and sub-ranges therebetween. In one or more embodiments, the Fe source may be oxalate/I2, $Fe_2O_3$/I8. In some embodiments, the about of Fe expressed as $Fe_2O_3$ is expressed in weight % in a range from about 0.1 weight % to about 5 weight %, from about 0.1 weight % to about 4 weight %, from about 0.1 weight % to about 3 weight %, from about 0.1 weight % to about 2.5 weight %, from about 0.2 weight % to about 5 weight %, from about 0.3 weight % to about 5 weight %, or from about 0.4 weight % to about 5 weight %, and all ranges and sub-ranges therebetween.

In one or more embodiments, the glass composition comprises a total amount of Co, expressed as $Co_3O_4$, in an amount in the range from about 0.001 mol % to 0.01 mol %, from about 0.002 mol % to 0.01 mol %, from about 0.003 mol % to 0.01 mol %, from about 0.004 mol % to 0.01 mol %, from about 0.005 mol % to 0.01 mol %, from about 0.006 mol % to 0.01 mol %, from about 0.007 mol % to 0.01 mol %, from about 0.001 mol % to 0.009 mol %, from about 0.001 mol % to 0.008 mol %, from about 0.001 mol % to 0.007 mol %, from about 0.001 mol % to 0.006 mol %, or from about 0.001 mol % to 0.005 mol %, and all ranges and sub-ranges therebetween.

The glass composition of one or more embodiments may include any one or more of NiO, $V_2O_5$, and $TiO_2$.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$. Where the glass composition includes NiO, NiO may be present in an amount of about 0.6 mol % or less, or about 0.1 mol % or less. In one or more embodiments, the glass composition may be substantially free of NiO. In one or more embodiments, the glass composition may be substantially free of $V_2O_5$. In one or more embodiments, the glass composition may be substantially free of $TiO_2$. In one or more embodiments, the glass composition may be substantially free of any two or all three of NiO, $V_2O_5$, and $TiO_2$.

In one or more embodiments, the glass composition may include less than about 0.9 mol % CuO (e.g., less than about 0.5 mol %, less than about 0.1 mol %, or less than about 0.01 mol %). In some embodiments, the glass composition is substantially free of CuO.

In one or more embodiments, the glass composition may include less than about 0.2 mol % Se (e.g., less than about 0.1 mol %, or less than about 0.01 mol %). In some embodiments, the glass composition is substantially free of Se.

The various embodiments of the glass articles described herein have glass compositions that exhibit one or more of relatively low anneal point, softening point, sag temperature and relatively high liquidus viscosities.

In one or more embodiments, the glass composition or glass articles formed from those compositions exhibit an annealing point that is about 600° C. or less, 590° C. or less, 580° C. or less or about 570° C. or less. In one or more embodiments, the glass composition or glass articles formed from those compositions exhibit an annealing point in a range from about 520° C. to about 600° C. The annealing point may be in a range from about 520° C. to about 595° C., from about 520° C. to about 590° C., from about 520° C. to about 585° C., from about 520° C. to about 580° C., from about 520° C. to about 575° C., from about 520° C. to about 570° C., from about 520° C. to about 565° C., from about 525° C. to about 600° C., from about 530° C. to about 600° C., from about 535° C. to about 600° C., from about 540° C. to about 600° C., from about 545° C. to about 600° C., from about 550° C. to about 600° C., from about 555° C. to about 600° C., or from about 560° C. to about 590° C., and all ranges and sub-ranges therebetween. The annealing point was determined using the beam bending viscosity method of ASTM C598-93 (2013).

In one or more embodiments, the glass composition or glass articles formed from those compositions exhibit a strain point that is about 520° C. or less. In one or more embodiments, the glass composition or glass articles formed from those compositions exhibit an annealing point in a range from about 450° C. to about 520° C. The strain point may be in a range from about 460° C. to about 520° C., from about 470° C. to about 520° C., from about 480° C. to about 520° C., from about 490° C. to about 520° C., from about 500° C. to about 520° C., from about 450° C. to about 510° C., from about 450° C. to about 500° C., from about 450° C. to about 490° C., or from about 450° C. to about 480° C., and all ranges and sub-ranges therebetween. The strain point was determined using the beam bending viscosity method of ASTM C598-93 (2013).

In one or more embodiments, the glass composition or glass articles formed from those compositions exhibit a softening point in a range from about 725° C. and 860° C. The softening point may be in a range from about 730° C. to about 860° C., from about 740° C. to about 860° C., from about 750° C. to about 860° C., from about 760° C. to about 860° C., from about 770° C. to about 860° C., from about 780° C. to about 860° C., from about 790° C. to about 860° C., from about 800° C. to about 860° C., from about 810° C. to about 860° C., from about 820° C. to about 860° C., from about 830° C. to about 860° C., from about 725° C. to about 850° C., from about 725° C. to about 840° C., from about 725° C. to about 830° C., from about 725° C. to about 820° C., from about 725° C. to about 810° C., from about 725° C. to about 800° C., from about 725° C. to about 775° C., or from about 725° C. to about 750° C., and all ranges and sub-ranges therebetween. The softening point was determined using the parallel plate viscosity method of ASTM C1351M-96 (2012).

In one or more embodiments, the glass composition or glass articles formed from those compositions exhibit a temperature difference magnitude between its annealing point and softening point of greater than about 150° C., greater than about 155° C., greater than about 160° C., greater than about 165° C., greater than about 170° C., greater than about 175° C., greater than about 180° C., greater than about 185° C., greater than about 190° C., greater than about 195° C., greater than about 200° C., greater than about 205° C., greater than about 210° C., greater than about 215° C., greater than about 220° C., or greater than about 225° C. In some embodiments, the difference is in a range from about 150° C. to about 300° C., from about 150° C. to about 290° C., from about 150° C. to about 280° C., from about 150° C. to about 270° C., from about 150° C. to about 260° C., from about 150° C. to about 250° C., from about 150° C. to about 240° C., from about 150° C. to about 230° C., from about 150° C. to about 220° C., from about 150° C. to about 210° C., from about 150° C. to about 200° C., from about 160° C. to about 300° C., from about 170° C. to about 300° C., from about 180° C. to about 300° C., from about 190° C. to about 300° C., from about 200° C. to about 300° C., from about 210° C. to about 300° C., from about 220° C. to about 300° C., from about 230° C. to about 300° C., from about 240° C. to about 300° C., from about 250° C. to about 300° C., from about 155° C. to about 225° C., from about 165° C. to about 225° C., from about 175° C. to about 225° C., from about 185° C. to about 225° C., from about 155° C. to about 220° C., from about 155° C. to about 215° C., from about 155° C. to about 210° C., or from about 155° C. to about 205° C.

In one or more embodiments, the glass composition or glass articles formed from those compositions exhibit a sag temperature in a range from about 600° C. to about 700° C., as determined by the method described herein. In one or more embodiments, the glass composition or glass articles formed from those compositions exhibit a sag temperature in a range from about 610° C. to about 700° C., from about 620° C. to about 700° C., from about 630° C. to about 700° C., from about 640° C. to about 700° C., from about 650° C. to about 700° C., from about 600° C. to about 690° C., from about 600° C. to about 680° C., from about 600° C. to about 670° C., from about 600° C. to about 660° C., from about 600° C. to about 650° C., from about 630° C. to about 690° C., from about 640° C. to about 680° C., or from about 650° C. to about 670° C., and all ranges and sub-ranges therebetween.

In one or more embodiments, the glass composition (or article formed therefrom) comprises a liquidus viscosity that enables the formation of the glass articles via specific techniques. As used herein, the term "liquidus viscosity" refers to the viscosity of a molten glass at the liquidus temperature, wherein the term "liquidus temperature" refers to the temperature at which crystals first appear as a molten glass cools down from the melting temperature (or the temperature at which the very last crystals melt away as temperature is increased from room temperature).

In one or more embodiments, the glass composition (or the glass article formed therefrom) exhibits a liquidus viscosity greater than or equal to about 50 kilopoise (kP), greater than or equal to about 500 kP, or greater than or equal to about 1000 kP. In one or more embodiments, the glass composition (or glass article formed therefrom) exhibits a liquidus viscosity in the range from about 50 kP to about 5,000 kP. In some embodiments, the glass composition (or the glass article formed therefrom) exhibits a liquidus viscosity of less than about 300 kP or less. In some embodiments, the glass composition (or the glass article formed therefrom) exhibits a liquidus viscosity of about 250 kP or less, about 200 kP or less, or about 180 kP or less. In some embodiments, the glass composition (or the glass article formed therefrom) exhibits a liquidus viscosity of about 350 kP or greater, about 400 kP or greater, about 450 kP or greater, about 500 kP or greater, about 750 kP or greater, about 1000 kP or greater, or about 2000 kP or greater. The liquidus viscosity is determined by the following method.

First the liquidus temperature of the glass is measured in accordance with ASTM C829-81 (2015), titled "Standard Practice for Measurement of Liquidus Temperature of Glass by the Gradient Furnace Method". Next the viscosity of the glass at the liquidus temperature is measured in accordance with ASTM C965-96 (2012), titled "Standard Practice for Measuring Viscosity of Glass Above the Softening Point".

In one or more embodiments, the glass composition or glass articles formed from those compositions exhibit a temperature at a viscosity of about 35 kP that is greater than about 1000° C., as measured by Fulcher fit to high temperature viscosity (HTV) data (i.e., all the temperature measurements from 100 kP to 100 poise). In some embodiments, the glass composition or glass articles formed from those compositions exhibit a temperature at a viscosity of about 35 kP that is about 1010° C. or greater, about 1020° C. or greater, about 1030° C. or greater, about 1040° C. or greater, about 1050° C. or greater, about 1060° C. or greater, about 1070° C. or greater, about 1080° C. or greater, about 1090° C. or greater, about 1100° C. or greater, about 1110° C. or greater, about 1120° C. or greater, about 1130° C. or greater, about 1140° C. or greater, about 1150° C. or greater, about 1160° C. or greater, about 1170° C. or greater, about 1180° C. or greater, about 1190° C. or greater, about 1200° C. or greater, about 1210° C. or greater, about 1220° C. or greater, about 1230° C. or greater, about 1240° C. or greater, or about 1250° C. or greater. In some embodiments, the glass composition or glass articles formed from those compositions exhibit a temperature at a viscosity of about $10^4$ poise in a range from about 1000° C. to about 1300° C., from about 1010° C. to about 1300° C., from about 1020° C. to about 1300° C., from about 1030° C. to about 1300° C., from about 1040° C. to about 1300° C., from about 1050° C. to about 1300° C., from about 1060° C. to about 1300° C., from about 1070° C. to about 1300° C., from about 1080° C. to about 1300° C., from about 1090° C. to about 1300° C., from about 1100° C. to about 1300° C., from about 1110° C. to about 1120° C., from about 1130° C. to about 1300° C., from about 1140° C. to about 1300° C., from about 1150° C. to about 1300° C., from about 1160° C. to about 1300° C., from about 1170° C. to about 1300° C., from about 1180° C. to about 1300° C., from about 1190° C. to about 1300° C., from about 1200° C. to about 1300° C., from about 1210° C. to about 1300° C., from about 1220° C. to about 1230° C., from about 1240° C. to about 1300° C., from about 1250° C. to about 1300° C., from about 1100° C. to about 1290° C., from about 1100° C. to about 1280° C., from about 1100° C. to about 1270° C., from about 1100° C. to about 1260° C., from about 1100° C. to about 1250° C., from about 1100° C. to about 1240° C., from about 1100° C. to about 1230° C., from about 1100° C. to about 1220° C., from about 1100° C. to about 1210° C., from about 1100° C. to about 1200° C., from about 1125° C. to about 1200° C., or rom about 1150° C. to about 1250° C.

In one or more embodiments, the glass composition or glass articles formed from those compositions exhibit a temperature at a viscosity of about 200 kP that is greater than about 900° C., as measured by Fulcher fit to high temperature viscosity (HTV) data (i.e., all the temperature measurements from 100 kP to 100 poise). In some embodiments, the glass composition or glass articles formed from those compositions exhibit a temperature at a viscosity of about 200 kP that is about 910° C. or greater, 920° C. or greater, 930° C. or greater, 940° C. or greater, 950° C. or greater, 960° C. or greater, 970° C. or greater, 980° C. or greater, 990° C. or greater, 1000° C. or greater, 1010° C. or greater, about 1020° C. or greater, about 1030° C. or greater, about 1040° C. or greater, about 1050° C. or greater, about 1060° C. or greater, about 1070° C. or greater, about 1080° C. or greater, about 1090° C. or greater, about 1100° C. or greater, about 1150° C. or greater, about 1200° C. or greater, or about 1250° C. or greater. In some embodiments, the glass composition or glass articles formed from those compositions exhibit a temperature at a viscosity of about 200 kP in a range from about 900° C. to about 1200° C., from about 925° C. to about 1200° C., from about 950° C. to about 1200° C., from about 975° C. to about 1200° C., from about 1000° C. to about 1200° C., from about 1050° C. to about 1200° C., from about 1100° C. to about 1200° C., from about 1150° C. to about 1200° C., from about 1200° C. to about 1200° C., from about 900° C. to about 1190° C., from about 900° C. to about 1180° C., from about 900° C. to about 1170° C., from about 900° C. to about 1160° C., from about 900° C. to about 1150° C., from about 900° C. to about 1140° C., from about 900° C. to about 1130° C., from about 900° C. to about 1120° C., from about 900° C. to about 1110° C., from about 900° C. to about 1100° C., from about 900° C. to about 1050° C., or from about 900° C. to about 1000° C.

In one or more embodiments, the glass composition or the glass article formed therefrom exhibit a density at 20° C. that is less than about 2.5 g/cm³. In one or more embodiments, the density of the glass composition or the glass article formed therefrom is about 2.45 g/cm³ or less, about 2.4 g/cm³ or less, about 2.35 g/cm³ or less, or about 2.3 g/cm³ or less. The density was determined using the buoyancy method of ASTM C693-93 (2013).

Coefficients of thermal expansion (CTE) are expressed in terms of parts per million (ppm)/° C. and represent a value measured over a temperature range from about 20° C. to about 300° C., unless otherwise specified. High temperature (or liquid) coefficients of thermal expansion (high temperature CTE) are also expressed in terms of part per million (ppm) per degree Celsius (ppm/° C.), and represent a value measured in the high temperature plateau region of the instantaneous coefficient of thermal expansion (CTE) vs. temperature curve. The high temperature CTE measures the volume change associated with heating or cooling of the glass through the transformation region.

In one or more embodiments, the glass article exhibits CTE measured over a temperature range from about 20° C. to about 300° C. in the range from about $45\times10^{-7}$ ppm/° C. or greater. In some embodiments, the glass article exhibits CTE a high temperature (or liquid) CTE in the range from about $45\times10^{-7}$ ppm/° C. to about $80\times10^{-7}$ ppm/° C., from about $46\times10^{-7}$ ppm/° C. to about $80\times10^{-7}$ ppm/° C., from about $48\times10^{-7}$ ppm/° C. to about $80\times10^{-7}$ ppm/° C., from about $50\times10^{-7}$ ppm/° C. to about $80\times10^{-7}$ ppm/° C., from about $52\times10^{-7}$ ppm/° C. to about $80\times10^{-7}$ ppm/° C., from about $54\times10^{-7}$ ppm/° C. to about $80\times10^{-7}$ ppm/° C., from about $55\times10^{-7}$ ppm/° C. to about $80\times10^{-7}$ ppm/° C., from about $45\times10^{-7}$ ppm/° C. to about $78\times10^{-7}$ ppm/° C., from about $45\times10^{-7}$ ppm/° C. to about $76\times10^{-7}$ ppm/° C., from about $45\times10^{-7}$ ppm/° C. to about $75\times10^{-7}$ ppm/° C., from about $45\times10^{-7}$ ppm/° C. to about $74\times10^{-7}$ ppm/° C., from about $45\times10^{-7}$ ppm/° C. to about $72\times10^{-7}$ ppm/° C., from about $45\times10^{-7}$ ppm/° C. to about $70\times10^{-7}$ ppm/° C., from about $45\times10^{-7}$ ppm/° C. to about $68\times10^{-7}$ ppm/° C., from about $45\times10^{-7}$ ppm/° C. to about $66\times10^{-7}$ ppm/° C., from about $45\times10^{-7}$ ppm/° C. to about $65\times10^{-7}$ ppm/° C., from about $45\times10^{-7}$ ppm/° C. to about $64\times10^{-7}$ ppm/° C., from about $45\times10^{-7}$ ppm/° C. to about $62\times10^{-7}$ ppm/° C., from about $45\times10^{-7}$ ppm/° C. to about $60\times10^{-7}$ ppm/° C., from about $45\times10^{-7}$ ppm/° C. to about $58\times10^{-7}$ ppm/° C., from about 45×10$^{-7}$ ppm/° C. to about 56×10$^{-7}$ ppm/° C., or from about 45×10$^{-7}$ ppm/° C. to about 55×10$^{-7}$ ppm/° C.

In one or more embodiments, the glass article exhibits a Young's modulus in the range from about 60 GPa to about 75 GPa, from about 62 GPa to about 75 GPa, from about 64 GPa to about 75 GPa, from about 65 GPa to about 75 GPa, from about 66 GPa to about 75 GPa, from about 68 GPa to about 75 GPa, from about 70 GPa to about 75 GPa, from about 60 GPa to about 74 GPa, from about 60 GPa to about 72 GPa, from about 60 GPa to about 70 GPa, from about 60 GPa to about 68 GPa, from about 60 GPa to about 66 GPa, from about 60 GPa to about 65 GPa, from about 60 GPa to about 75 GPa, or from 62 MPa to about 68 MPa.

Referring to FIG. 2, embodiments of the glass article 100 include a first major surface 102, an opposing second major surface 104 defining a thickness t 110 between the first major surface and the second major surface.

In one or more embodiments, the thickness t may be about 3 millimeters or less (e.g., in the range from about 0.01 millimeter to about 3 millimeters, from about 0.1 millimeter to about 3 millimeters, from about 0.2 millimeter to about 3 millimeters, from about 0.3 millimeter to about 3 millimeters, from about 0.4 millimeter to about 3 millimeters, from about 0.01 millimeter to about 2.5 millimeters, from about 0.01 millimeter to about 2 millimeters, from about 0.01 millimeter to about 1.5 millimeters, from about 0.01 millimeter to about 1 millimeter, from about 0.01 millimeter to about 0.9 millimeter, from about 0.01 millimeter to about 0.8 millimeter, from about 0.01 millimeter to about 0.7 millimeter, from about 0.01 millimeter to about 0.6 millimeter, from about 0.01 millimeter to about 0.5 millimeter, from about 0.1 millimeter to about 0.5 millimeter, or from about 0.3 millimeter to about 0.5 millimeter.)

Figure 3:
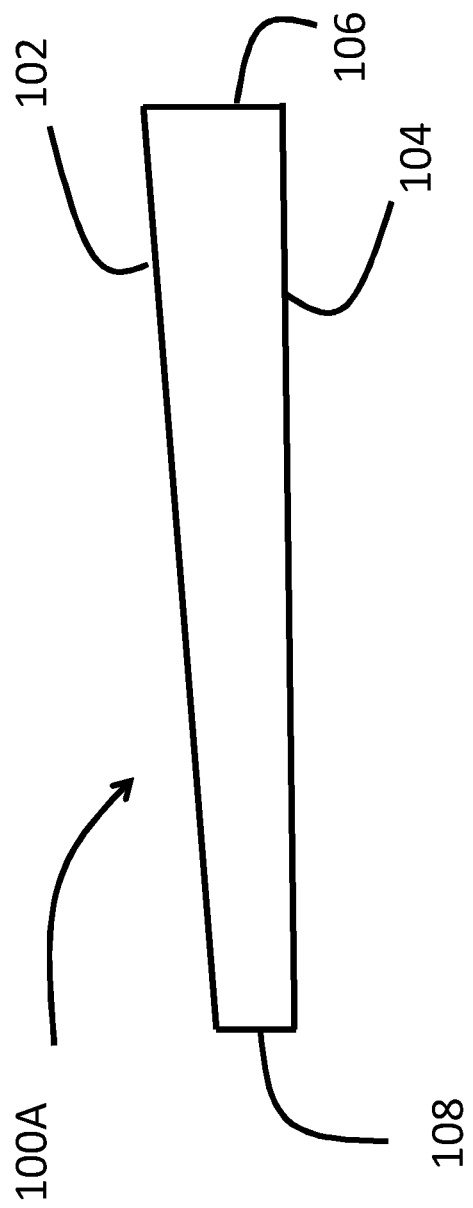
FIG. 3 is a side view illustration of a glass article according to one or more embodiments.

The glass article may be substantially planar sheet, although other embodiments may utilize a curved or otherwise shaped or sculpted article. In some instances, the glass article may have a 3D or 2.5D shape. Additionally or alternatively, the thickness of the glass article may be constant along one or more dimension or may vary along one or more of its dimensions for aesthetic and/or functional reasons. For example, the edges of the glass article may be thicker as compared to more central regions of the glass article. The length, width and thickness dimensions of the glass article may also vary according to the article application or use. In some embodiments, the glass article 100A may have a wedged shape in which the thickness at one minor surface 106 is greater than the thickness at an opposing minor surface 108, as illustrated in FIG. 3. Where the thickness varies, the thickness ranges disclosed herein are the maximum thickness between the major surfaces.

The glass article may have a refractive index in the range from about 1.45 to about 1.55. As used herein, the refractive index values are with respect to a wavelength of 550 nm.

The glass article may be characterized by the manner in which it is formed. For instance, where the glass article may be characterized as float-formable (i.e., formed by a float process), down-drawable and, in particular, fusion-formable or slot-drawable (i.e., formed by a down draw process such as a fusion draw process or a slot draw process).

Some embodiments of the glass articles described herein may be formed by a float process. A float-formable glass article may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass article that can be lifted from the tin onto rollers. Once off the bath, the glass article can be cooled further and annealed to reduce internal stress.

Some embodiments of the glass articles described herein may be formed by a down-draw process. Down-draw processes produce glass articles having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass articles may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass articles described herein may be formed by a slot draw process. The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

In one or more embodiments, the glass articles described herein may exhibit an amorphous microstructure and may be substantially free of crystals or crystallites. In other words, the glass articles exclude glass-ceramic materials.

In one or more embodiments, the glass article exhibits a total solar transmittance of about 90% or less, over a wavelength range from about 300 nm to about 2500 nm, when the glass article has a thickness of 0.7 mm. For example, the glass article exhibits a total solar transmittance in a range from about 60% to about 88%, from about 62% to about 88%, from about 64% to about 88%, from about 65% to about 88%, from about 66% to about 88%, from about 68% to about 88%, from about 70% to about 88%, from about 72% to about 88%, from about 60% to about 86%, from about 60% to about 85%, from about 60% to about 84%, from about 60% to about 82%, from about 60% to about 80%, from about 60% to about 78%, from about 60% to about 76%, from about 60% to about 75%, from about 60% to about 74%, or from about 60% to about 72%.

In one or embodiments, the glass article exhibits an average transmittance in the range from about 75% to about 85%, at a thickness of 0.7 mm or 1 mm, over a wavelength range from about 380 nm to about 780 nm. In some embodiments, the average transmittance at this thickness and over this wavelength range may be in a range from about 75% to about 84%, from about 75% to about 83%, from about 75% to about 82%, from about 75% to about 81%, from about 75% to about 80%, from about 76% to about 85%, from about 77% to about 85%, from about 78% to about 85%, from about 79% to about 85%, or from about 80% to about 85%. In one or more embodiments, the glass article exhibits $T_{uv\text{-}380}$ or $T_{uv\text{-}400}$ of 50% or less (e.g., 49% or less, 48% or less, 45% or less, 40% or less, 30% or less, 25% or less, 23% or less, 20% or less, or 15% or less), at a thickness of 0.7 mm or 1 mm, over a wavelength range from about 300 nm to about 400 nm.

In one or more embodiments, the glass article may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, the glass article may be strengthened mechanically by utilizing a mismatch of the coefficient of thermal expansion between portions of the article to create a compressive stress region and a central region exhibiting a tensile stress. In some embodiments, the glass article may be strengthened thermally by heating the glass to a temperature below the glass transition point and then rapidly quenching.

In one or more embodiments, the glass article may be chemically strengthening by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass article generate a stress.

Ion exchange processes are typically carried out by immersing a glass article in a molten salt bath (or two or more molten salt baths) containing the larger ions to be exchanged with the smaller ions in the glass article. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass article in a salt bath (or baths), use of multiple salt baths, additional steps such as annealing, washing, and the like, are generally determined by the composition of the glass article (including the structure of the article and any crystalline phases present) and the desired DOC and CS of the glass article that results from strengthening. Exemplary molten bath composition may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass article thickness, bath temperature and glass (or monovalent ion) diffusivity. However, temperatures and immersion times different from those described above may also be used.

In one or more embodiments, the glass articles may be immersed in a molten salt bath of 100% $NaNO_3$, 100% $KNO_3$, or a combination of $NaNO_3$ and $KNO_3$ having a temperature from about 370° C. to about 480° C. In some embodiments, the glass article may be immersed in a molten mixed salt bath including from about 5% to about 90% $KNO_3$ and from about 10% to about 95% $NaNO_3$. In one or more embodiments, the glass article may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass article may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass article. The spike may result in a greater surface CS value. This spike can be achieved by single bath or multiple baths, with the bath(s) having a single composition or mixed composition, due to the unique properties of the glass compositions used in the glass articles described herein.

In one or more embodiments, where more than one monovalent ion is exchanged into the glass article, the different monovalent ions may exchange to different depths within the glass article (and generate different magnitudes stresses within the glass article at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass article. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass article is chemically strengthened by an ion exchange treatment, FSM or SCALP may be used depending on which ion is exchanged into the glass article. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Central tension or CT is the maximum tensile stress and is measured by SCALP.

In one or more embodiments, the glass article maybe strengthened to exhibit a DOC that is described a fraction of the thickness t of the glass article (as described herein). For example, in one or more embodiments, the DOC may be equal to or greater than about 0.03t, equal to or greater than about 0.05t, equal to or greater than about 0.06t, equal to or greater than about 0.1t, equal to or greater than about 0.11t, equal to or greater than about 0.12t, equal to or greater than about 0.13t, equal to or greater than about 0.14t, equal to or greater than about 0.15t, equal to or greater than about 0.16t, equal to or greater than about 0.17t, equal to or greater than about 0.18t, equal to or greater than about 0.19t, equal to or greater than about 0.2t, equal to or greater than about 0.21t. In some embodiments, The DOC may be in a range from about 0.08t to about 0.25t, from about 0.09t to about 0.25t, from about 0.18t to about 0.25t, from about 0.11t to about 0.25t, from about 0.12t to about 0.25t, from about 0.13t to about 0.25t, from about 0.14t to about 0.25t, from about 0.15t to about 0.25t, from about 0.08t to about 0.24t, from about 0.08t to about 0.23t, from about 0.08t to about 0.22t, from about 0.08t to about 0.21t, from about 0.08t to about 0.2t, from about 0.08t to about 0.19t, from about 0.08t to about 0.18t, from about 0.08t to about 0.17t, from about 0.08t to about 0.16t, or from about 0.08t to about 0.15t. In some instances, the DOC may be about 20 μm or less. In one or more embodiments, the DOC may be about 40 μm or greater (e.g., from about 40 μm to about 300 μm, from about 50 μm to about 300 μm, from about 60 μm to about 300 μm, from about 70 μm to about 300 μm, from about 80 μm to about 300 μm, from about 90 μm to about 300 μm, from about 100 μm to about 300 μm, from about 110 μm to about 300 μm, from about 120 μm to about 300 μm, from about 140 μm to about 300 μm, from about 150 μm to about 300 μm, from about 40 μm to about 290 μm, from about 40 μm to about 280 μm, from about 40 μm to about 260 μm, from about 40 μm to about 250 μm, from about 40 μm to about 240 μm, from about 40 μm to about 230 μm, from about 40 μm to about 220 μm, from about 40 μm to about 210 μm, from about 40 μm to about 200 μm, from about 40 μm to about 180 μm, from about 40 μm to about 160 μm, from about 40 μm to about 150 μm, from about 40 μm to about 140 μm, from about 40 μm to about 130 μm, from about 40 μm to about 120 μm, from about 40 μm to about 110 μm, or from about 40 μm to about 100 μm.

In one or more embodiments, the strengthened glass article may have a CS (which may be found at the surface or a depth within the glass article) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass article may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

Figure 4:
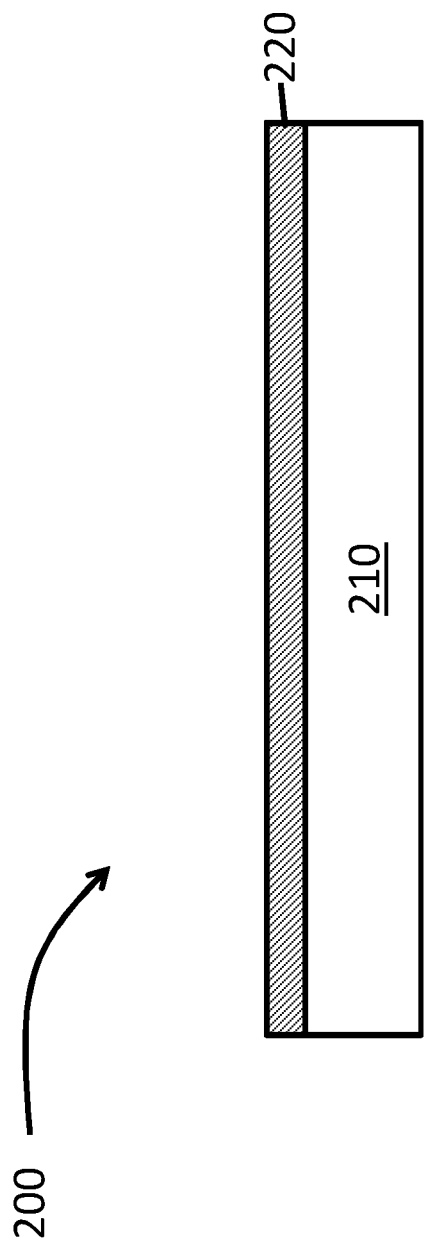
FIG. 4 is a side view illustration of a laminate including a glass article according to one or more embodiments.
Figure 5:
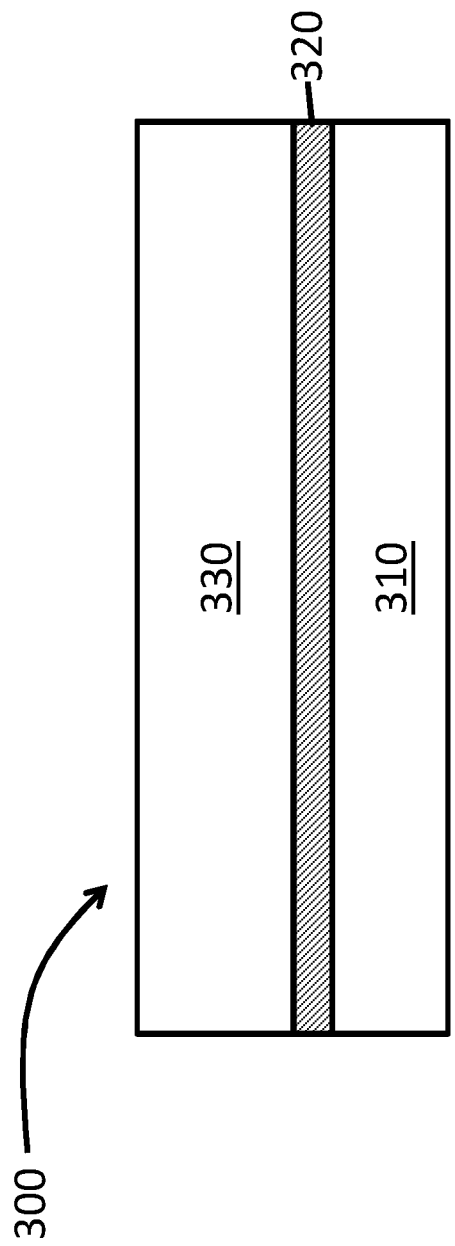
FIG. 5 is a side view illustration of a laminate including a glass article according to one or more embodiments.

A third aspect of this disclosure pertains to a laminate comprising a glass article as described herein. In one or more embodiments, the laminate 200 may include a first glass layer 210 comprising a glass article according to one or more embodiments, and an interlayer 220 disposed on the first glass layer, as illustrated in FIG. 4. As shown in FIG. 5, the laminate 300 may include a first glass layer 310, an interlayer 320 disposed on the first layer, and a second glass layer 330 disposed on the interlayer 320 opposite the first glass layer 310. Either one or both of the first glass layer and the second glass layer used in the laminate can include a glass article described herein. As shown in FIG. 5, the interlayer 320 is disposed between the first and second glass layers.

In one or more embodiments, the laminate 300 may include a first glass layer comprising a glass article as described herein, and a second glass layer that includes a different composition than the glass articles described herein. For example, the second glass layer may include soda-lime glass, alkali aluminosilicate glass, alkali containing borosilicate glass, alkali aluminophosphosilicate glass, or alkali aluminoborosilicate glass.

In one or more embodiments, either one or both the first glass layer and the second glass layer comprise a thickness less than 1.6 mm (e.g., 1.55 mm or less, 1.5 mm or less, 1.45 mm or less, 1.4 mm or less, 1.35 mm or less, 1.3 mm or less, 1.25 mm or less, 1.2 mm or less, 1.15 mm or less, 1.1 mm or less, 1.05 mm or less, 1 mm or less, 0.95 mm or less, 0.9 mm or less, 0.85 mm or less, 0.8 mm or less, 0.75 mm or less, 0.7 mm or less, 0.65 mm or less, 0.6 mm or less, 0.55 mm or less, 0.5 mm or less, 0.45 mm or less, 0.4 mm or less, 0.35 mm or less, 0.3 mm or less, 0.25 mm or less, 0.2 mm or less, 0.15 mm or less, or about 0.1 mm or less). The lower limit of thickness may be 0.1 mm, 0.2 mm or 0.3 mm. In some embodiments, the thickness of either one or both the first glass layer and the second glass layer is in the range from about 0.1 mm to less than about 1.6 mm, from about 0.1 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1 mm, from about 0.1 mm to about 0.9 mm, from about 0.1 mm to about 0.8 mm, from about 0.1 mm to about 0.7 mm, from about 0.1 mm, from about 0.2 mm to less than about 1.6 mm, from about 0.3 mm to less than about 1.6 mm, from about 0.4 mm to less than about 1.6 mm, from about 0.5 mm to less than about 1.6 mm, from about 0.6 mm to less than about 1.6 mm, from about 0.7 mm to less than about 1.6 mm, from about 0.8 mm to less than about 1.6 mm, from about 0.9 mm to less than about 1.6 mm, or from about 1 mm to about 1.6 mm. In some embodiments, the first glass layer and the second glass layer have substantially the same thickness as one another.

In some embodiments, while one of the first and second glass layers has a thickness less than about 1.6 mm, the other of the first and second glass layers has a thickness that is about 1.6 mm or greater. In such embodiments, the first and the second glass layers have thicknesses that differ from one another. For example, the while one of the first and second glass layers has a thickness less than about 1.6 mm, the other of the first and second glass layers has a thickness that is about 1.7 mm or greater, about 1.75 mm or greater, about 1.8 mm or greater, about 1.7 mm or greater, about 1.7 mm or greater, about 1.7 mm or greater, about 1.85 mm or greater, about 1.9 mm or greater, about 1.95 mm or greater, about 2 mm or greater, about 2.1 mm or greater, about 2.2 mm or greater, about 2.3 mm or greater, about 2.4 mm or greater, 2.5 mm or greater, 2.6 mm or greater, 2.7 mm or greater, 2.8 mm or greater, 2.9 mm or greater, 3 mm or greater, 3.2 mm or greater, 3.4 mm or greater, 3.5 mm or greater, 3.6 mm or greater, 3.8 mm or greater, 4 mm or greater, 4.2 mm or greater, 4.4 mm or greater, 4.6 mm or greater, 4.8 mm or greater, 5 mm or greater, 5.2 mm or greater, 5.4 mm or greater, 5.6 mm or greater, 5.8 mm or greater, or 6 mm or greater. In some embodiments the first or second glass layers has a thickness in a range from about 1.6 mm to about 6 mm, from about 1.7 mm to about 6 mm, from about 1.8 mm to about 6 mm, from about 1.9 mm to about 6 mm, from about 2 mm to about 6 mm, from about 2.1 mm to about 6 mm, from about 2.2 mm to about 6 mm, from about 2.3 mm to about 6 mm, from about 2.4 mm to about 6 mm, from about 2.5 mm to about 6 mm, from about 2.6 mm to about 6 mm, from about 2.8 mm to about 6 mm, from about 3 mm to about 6 mm, from about 3.2 mm to about 6 mm, from about 3.4 mm to about 6 mm, from about 3.6 mm to about 6 mm, from about 3.8 mm to about 6 mm, from about 4 mm to about 6 mm, from about 1.6 mm to about 5.8 mm, from about 1.6 mm to about 5.6 mm, from about 1.6 mm to about 5.5 mm, from about 1.6 mm to about 5.4 mm, from about 1.6 mm to about 5.2 mm, from about 1.6 mm to about 5 mm, from about 1.6 mm to about 4.8 mm, from about 1.6 mm to about 4.6 mm, from about 1.6 mm to about 4.4 mm, from about 1.6 mm to about 4.2 mm, from about 1.6 mm to about 4 mm, from about 3.8 mm to about 5.8 mm, from about 1.6 mm to about 3.6 mm, from about 1.6 mm to about 3.4 mm, from about 1.6 mm to about 3.2 mm, or from about 1.6 mm to about 3 mm.

In one or more embodiments, the laminate 200, 300 may have a thickness of 6.85 mm or less, or 5.85 mm or less, where the thickness comprises the sum of thicknesses of the first glass layer, the second glass layer (as applicable), and the interlayer. In various embodiments, the laminate may have a thickness in the range of about 1.8 mm to about 6.85 mm, or in the range of about 1.8 mm to about 5.85 mm, or in the range of about 1.8 mm to about 5.0 mm, or 2.1 mm to about 6.85 mm, or in the range of about 2.1 mm to about 5.85 mm, or in the range of about 2.1 mm to about 5.0 mm, or in the range of about 2.4 mm to about 6.85 mm, or in the range of about 2.4 mm to about 5.85 mm, or in the range of about 2.4 mm to about 5.0 mm, or in the range of about 3.4 mm to about 6.85 mm, or in the range of about 3.4 mm to about 5.85 mm, or in the range of about 3.4 mm to about 5.0 mm.

In one or more embodiments, the laminate 300, 400 exhibits radii of curvature that is less than 1000 mm, or less than 750 mm, or less than 500 mm, or less than 300 mm. The laminate, the first glass layer and/or the second glass layer are substantially free of wrinkles.

In one or more embodiments the first glass layer is relatively thin in comparison to the second glass layer. In other words, the second glass layer has a thickness greater than the first glass layer. In one or more embodiments, the second glass layer may have a thickness that is more than two times the thickness of the first glass layer. In one or more embodiments, the second glass layer may have a thickness in the range from about 1.5 times to about 2.5 times the thickness of the first glass layer.

In one or more embodiments, the first glass layer and the second glass layer may have the same thickness; however, the second glass layer is more rigid or has a greater stiffness than the first glass layer, and in very specific embodiments, both the first glass layer and the second glass layer have a thickness in the range of 0.2 mm and 1.6 mm.

In one or more embodiments, the first glass layer has a first sag temperature and the second glass layer has a second sag temperature, wherein the difference between the first sag temperature and the second sag temperature is about 100° C. or less, about 90° C. or less, about 80° C. or less, about 75° C. or less, about 70° C. or less, about 60° C. or less, about 50° C. or less, about 40° C. or less, about 30° C. or less, about 20° C. or less, or about 10° C. or less.

In one or more embodiments, the first or second glass layer may utilize a glass article that is strengthened, as described herein. In one or more embodiments, the first glass layer comprises a strengthened glass article according to the embodiments described herein, while the second glass layer is not strengthened. In one or more embodiments, the first glass layer comprises a strengthened glass article according to the embodiments described herein, while the second glass layer is annealed. In one or more embodiments, the first glass layer is strengthened chemically, mechanically and/or thermally, while the second glass layer is strengthened in different manner than the first glass layer (chemically, mechanically and/or thermally). In one or more embodiments, the first glass layer is strengthened chemically, mechanically and/or thermally, while the second glass layer is strengthened in the same manner than the first glass layer (chemically, mechanically and/or thermally).

In one or more embodiments, the interlayer used herein (e.g., 320) may include a single layer or multiple layers. The interlayer (or layers thereof) may be formed polymers such as polyvinyl butyral (PVB), acoustic PBV (APVB), ionomers, ethylene-vinyl acetate (EVA) and thermoplastic polyurethane (TPU), polyester (PE), polyethylene terephthalate (PET) and the like. The thickness of the interlayer may be in the range from about 0.5 mm to about 2.5 mm, from about 0.8 mm to about 2.5 mm, from about 1 mm to about 2.5 mm or from about 1.5 mm to about 2.5 mm.

In one or more embodiments, one of the first glass layer or the second glass layer may be cold-formed (with an intervening interlayer). In an exemplary cold-formed laminate shown in FIGS. 6-7, a first glass layer 410 is laminated to a relatively thicker and curved second glass layer 430. In FIG. 5, second glass layer 430 includes a first surface 432 and a second surface 434 in contact with an interlayer 420, and the first glass layer 410 includes a third surface 412 in contact with the interlayer 420 and a fourth surface 414. An indicator of a cold-formed laminate is the fourth surface 414 has a greater surface CS than the third surface 412. Accordingly, a cold-formed laminate can comprise a high compressive stress level on fourth surface 414 making this surface more resistant to fracture.

In one or more embodiments, prior to the cold-forming process, the respective compressive stresses in the third surface 412 and fourth surface 414 are substantially equal. In one or more embodiments in which the first glass layer is unstrengthened, the third surface 412 and the fourth surface 414 exhibit no appreciable compressive stress, prior to cold-forming. In one or more embodiments in which the first glass layer 410 is strengthened (as described herein), the third surface 412 and the fourth surface 414 exhibit substantially equal compressive stress with respect to one another, prior to cold-forming. In one or more embodiments, after cold-forming, the compressive stress on the fourth surface 414 increases (i.e., the compressive stress on the fourth surface 414 is greater after cold-forming than before cold-forming). Without being bound by theory, the cold-forming process increases the compressive stress of the glass layer being shaped (i.e., the first glass layer) to compensate for tensile stresses imparted during bending and/or forming operations. In one or more embodiments, the cold-forming process causes the third surface of that glass layer (i.e., the third surface 412) to experience tensile stresses, while the fourth surface of the glass layer (i.e., the fourth surface 414) experiences compressive stresses.

When a strengthened first glass layer 410 is utilized, the third and fourth surfaces (412, 414) are already under compressive stress, and thus the third surface 412 can experience greater tensile stress. This allows for the strengthened first glass layer 410 to conform to more tightly curved surfaces.

In one or more embodiments, the first glass layer 410 has a thickness less than the second glass layer 430. This thickness differential means the first glass layer 410 is more flexible to conform to the shape of the second glass layer 430. Moreover, a thinner first glass layer 410 may deform more readily to compensate for shape mismatches and gaps created by the shape of the second glass layer 430. In one or more embodiments, a thin and strengthened first glass layer 410 exhibits greater flexibility especially during cold-forming. In one or more embodiments, the first glass layer 410 conforms to the second glass layer 430 to provide a substantially uniform distance between the second surface 434 and the third surface 412, which is filled by the interlayer.

Figure 6:
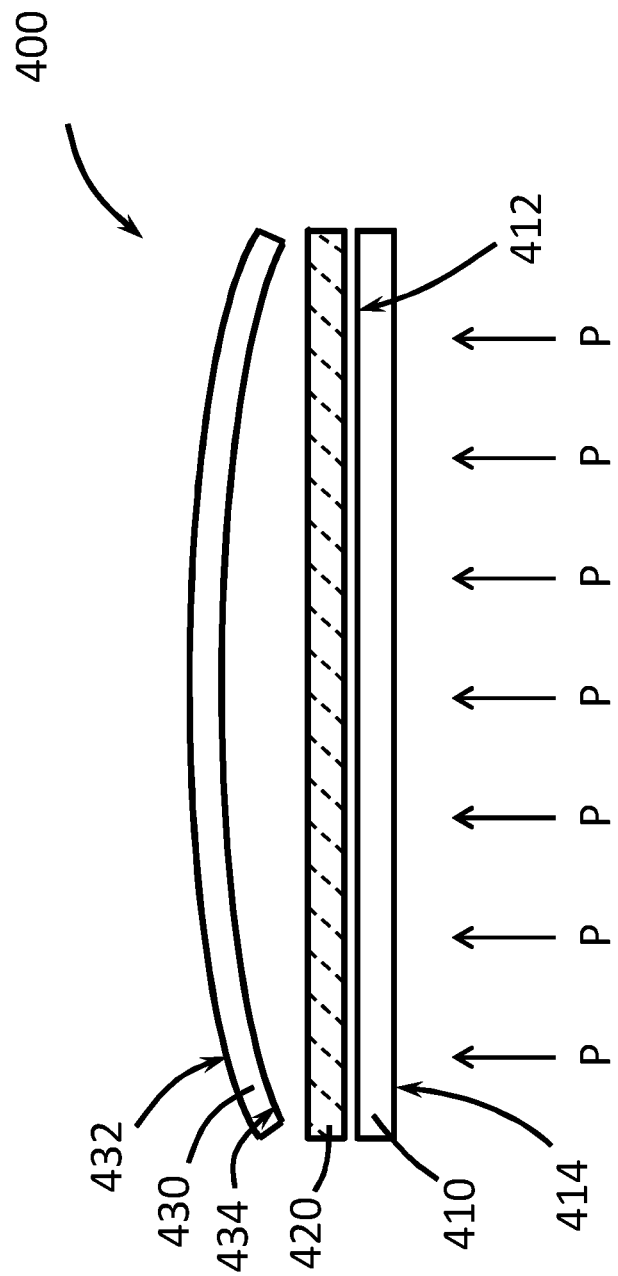
FIG. 6 is an exploded side view of the glass article to be cold-formed to another glass article according to one or more embodiments.

In some non-limiting embodiments, the cold-formed laminate 400 may be formed using an exemplary cold forming process that is performed at a temperature at or just above the softening temperature of the interlayer material (e.g., 420) (e.g., about 100° C. to about 120° C.), that is, at a temperature less than the softening temperature of the respective glass layers. In one embodiment as shown in FIG. 6, the cold-formed laminate may be formed by: placing an interlayer between the second glass layer (which is curved) and a first glass layer (which may be flat) to form a stack; applying pressure to the stack to press the second glass layer against the interlayer layer which is pressed against the first glass layer; and heating the stack to a temperature below 400° C. to form the cold-formed laminate in which the second glass layer conforms in shape to the first glass layer. Such a process can occur using a vacuum bag or ring in an autoclave or another suitable apparatus. The stress of an exemplary first glass layer 410 may change from substantially symmetrical to asymmetrical according to some embodiments of the present disclosure.

As used herein, "flat" and "planar" are used interchangeably and mean a shape having curvature less than a curvature at which lamination defects are created due to curvature mismatch, when such a flat substrate is cold-formed to another substrate (i.e., a radius of curvature of greater than or equal to about 3 meters, greater than or equal to about 4 meters or greater than or equal to about 5 meters) or a curvature (of any value) along only one axis. A flat substrate has the foregoing shape when placed on a surface. As used herein "complex curve" and "complexly curved" mean a non-planar shape having curvature along two orthogonal axes that are different from one another. Examples of complexly curved shapes includes having simple or compound curves, also referred to as non-developable shapes, which include but are not limited to spherical, aspherical, and toroidal. The complexly curved laminates according to embodiments may also include segments or portions of such surfaces, or be comprised of a combination of such curves and surfaces. In one or more embodiments, a laminate may have a compound curve including a major radius and a cross curvature. A complexly curved laminate according to one or more embodiments may have a distinct radius of curvature in two independent directions. According to one or more embodiments, complexly curved laminates may thus be characterized as having "cross curvature," where the laminate is curved along an axis (i.e., a first axis) that is parallel to a given dimension and also curved along an axis (i.e., a second axis) that is perpendicular to the same dimension. The curvature of the laminate can be even more complex when a significant minimum radius is combined with a significant cross curvature, and/or depth of bend. Some laminates may also include bending along axes that are not perpendicular to one another. As a non-limiting example, the complexly-curved laminate may have length and width dimensions of 0.5 m by 1.0 m and a radius of curvature of 2 to 2.5 m along the minor axis, and a radius of curvature of 4 to 5 m along the major axis. In one or more embodiments, the complexly-curved laminate may have a radius of curvature of 5 m or less along at least one axis. In one or more embodiments, the complexly-curved laminate may have a radius of curvature of 5 m or less along at least a first axis and along the second axis that is perpendicular to the first axis. In one or more embodiments, the complexly-curved laminate may have a radius of curvature of 5 m or less along at least a first axis and along the second axis that is not perpendicular to the first axis.

Figure 7:
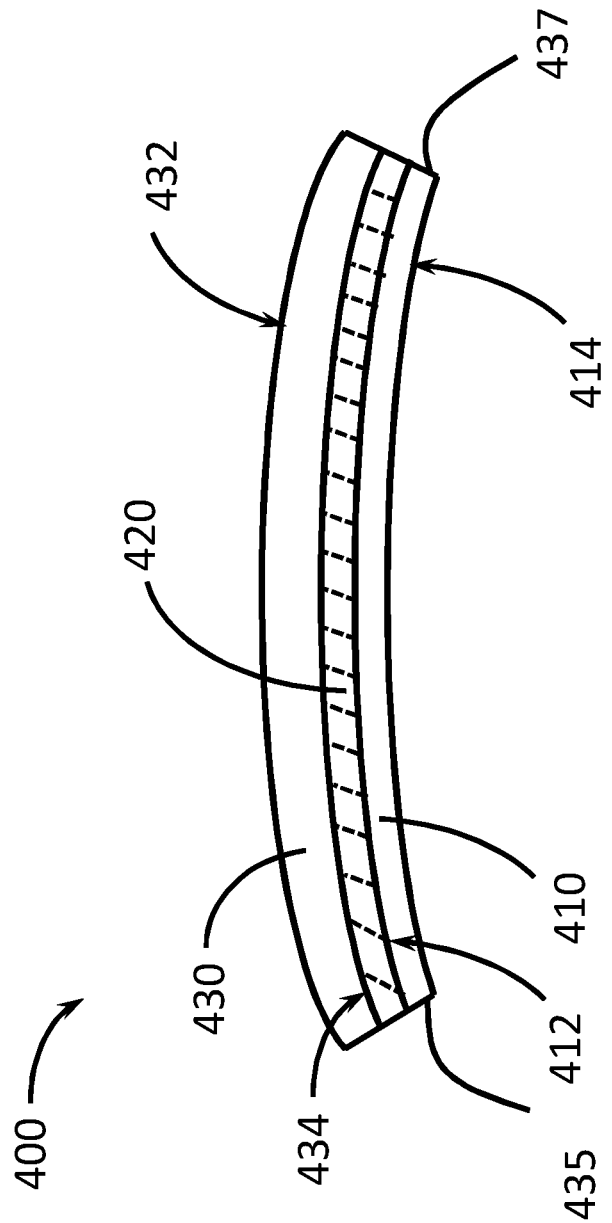
FIG. 7 is a side view illustration of the resulting cold-formed laminate of FIG. 6.

In one or more embodiments the first glass layer, the second glass layer, the laminate or a combination thereof may have a complexly curved shape and may optionally be cold-formed. As shown in FIG. 7, first glass layer 410 may be complexly-curved and have at least one concave surface (e.g., surface 414) providing a fourth surface of the laminate and at least one convex surface (e.g., surface 412) to provide a third surface of the laminate opposite the first surface with a thickness therebetween. In the cold-forming embodiment, the second glass sheet 430 may be complexly-curved and have at least one concave surface (e.g., second surface 434) and at least one convex surface (e.g., first surface 432) with a thickness therebetween.

In one or more embodiments, one or more of interlayer 420, first glass layer 410, and second glass layer 430 comprise a first edge (e.g., 435) with a first thickness and a second edge (e.g., 437) opposite the first edge with a second thickness greater than the first thickness.

Figure 8:
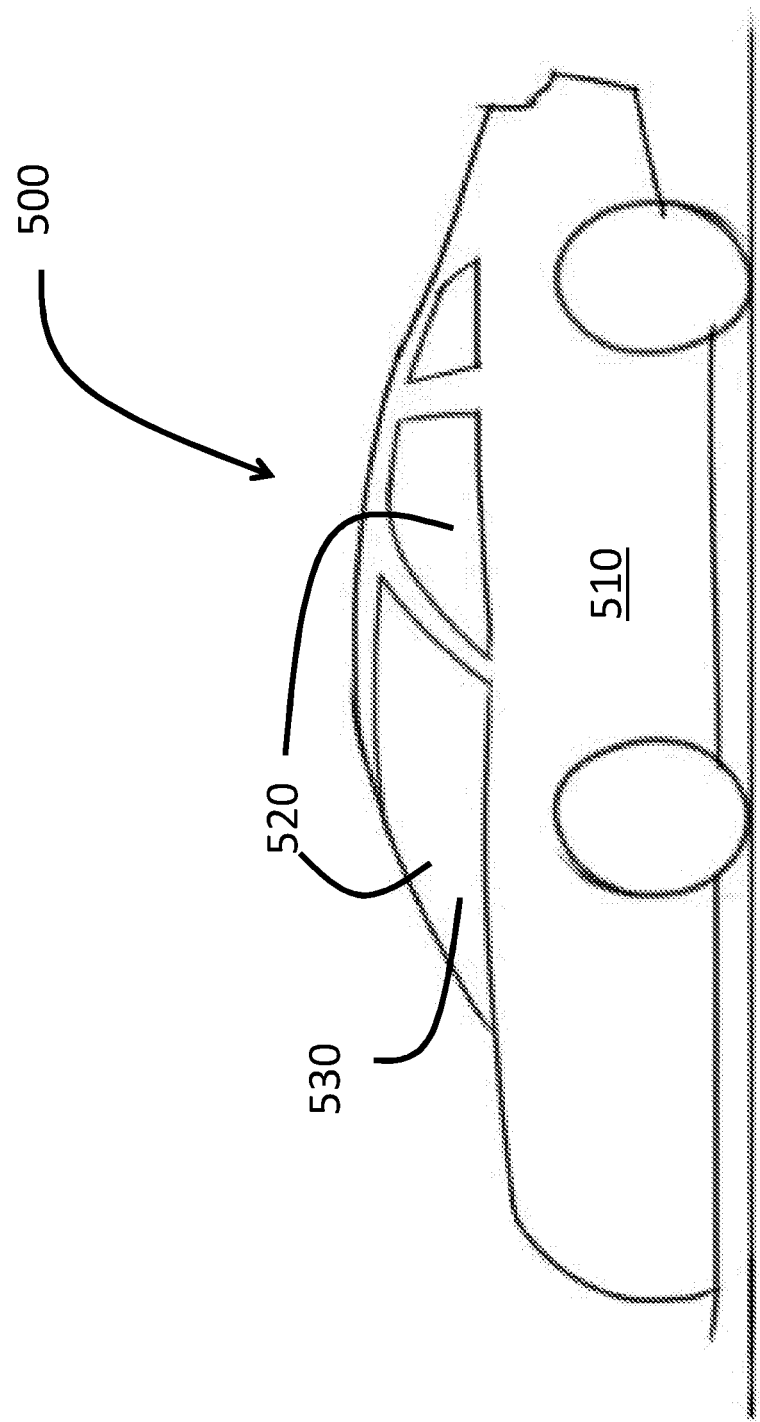
FIG. 8 is an illustration of a vehicle including a glass article or laminate according to one or more embodiments.

A fourth aspect of this disclosure pertains to a vehicle that includes the glass articles or laminates described herein. For example, as shown in FIG. 8 shows a vehicle 500 comprising a body 510 defining an interior, at least one opening 520 in communication with the interior, and a window disposed in the opening, wherein the window comprises a laminate or a glass article 530, according to one or more embodiments described herein. The laminate or glass article 530 may form the sidelights, windshields, rear windows, windows, rearview mirrors, and sunroofs in the vehicle. In some embodiments, the laminate or glass article 530 may form an interior partition (not shown) within the interior of the vehicle, or may be disposed on an exterior surface of the vehicle and form an engine block cover, headlight cover, taillight cover, or pillar cover. In one or more embodiments, the vehicle may include an interior surface (not shown, but may include door trim, seat backs, door panels, dashboards, center consoles, floor boards, and pillars), and the laminate or glass article described herein is disposed on the interior surface. In one or more embodiments, the glass article is cold-formed on the interior surface and affixed to the interior surface (in a cold-formed state) via an adhesive or mechanically. In one or more embodiments, the glass article is curved using heat or a hot-forming process and disposed on the interior surface. In one or more embodiment, the interior surface includes a display and the glass layer is disposed over the display. As used herein, vehicle includes automobiles, rolling stock, locomotive, boats, ships, and airplanes, helicopters, drones, space craft and the like.

Another aspect of this disclosure pertains to an architectural application that includes the glass articles or laminates described herein. In some embodiments, the architectural application includes balustrades, stairs, decorative panels or covering for walls, columns, partitions, elevator cabs, household appliances, windows, furniture, and other applications, formed at least partially using a laminate or glass article according to one or more embodiments.

In one or more embodiments, the portion of the laminate including the glass article is positioned within a vehicle or architectural application such that the glass article faces the interior of the vehicle or the interior of a building or room, such that the glass article is adjacent to the interior (and the other glass ply is adjacent the exterior). In some embodiments, the glass article of the laminate is in direct contact with the interior (i.e., the surface of the glass article facing the interior is bare and is free of any coatings).

In one or more embodiments, the portion of the laminate including the glass article is positioned within a vehicle or architectural application such that the glass article faces the exterior of the vehicle or the exterior of a building or room, such that the glass article is adjacent to the exterior (and the other glass ply is adjacent the interior). In some embodiments, the glass article of the laminate is in direct contact with the exterior (i.e., the surface of the glass article facing the exterior is bare and is free of any coatings).

In a first example (referring to FIG. 5 or 7), the laminate includes a first glass layer 310, 410 comprising a glass article according to one or more embodiments, a second glass layer 330, 430 comprising a SLG article, and an interlayer 320, 420 comprising PVB. In one or more embodiments, the glass article used in the first layer has a thickness of about 1 mm or less. In some embodiments, the glass article in the first layer is chemically strengthened. In some embodiments, the SLG article used in the second glass layer is annealed. In one or more embodiments, the laminate is positioned in a vehicle such that the first glass layer (comprising the glass article according to one or more embodiments) faces the interior of the vehicle.

In a second example (referring to FIG. 5 or 7), the laminate includes a first glass layer 310, 410 comprising a glass article according to one or more embodiments, a second glass layer 330, 430 comprising a SLG article, and an interlayer 320, 420 comprising PVB. In one or more embodiments, the glass article used in the first layer has a thickness of about 1 mm or less. In some embodiments, the glass article in the first layer is thermally strengthened. In some embodiments, the SLG article used in the second glass layer is annealed. In one or more embodiments, the laminate is positioned in a vehicle such that the first glass layer (comprising the glass article according to one or more embodiments) faces the interior of the vehicle.

A fifth aspect of this disclosure pertains to a method for forming the laminate including a glass article as described herein. In one or more embodiments, the method includes stacking a first glass article according to any one or more embodiments described herein, and a second glass article that differs from the first glass article to form a stack, wherein the first glass layer comprises a first surface and an second surface that opposes the first surface, and the second glass article comprises a third surface and a fourth surface that opposes the third surface, and wherein the second surface is adjacent to the third surface. In one or more embodiments, the first glass article and the second glass article differ in any one or more of composition, thickness, strengthening level, and forming method. In one or more embodiments, the method includes placing the stack on a mold, heating the stack to a temperature at which the second glass article exhibits a viscosity of $10^{10}$ poise or a viscosity of $10^{9.9}$ poise to form a shaped stack, and placing an interlayer between the first glass article and the second glass layer. In one or more embodiments, the shaped stack comprises a gap between the second surface and the third surface having a maximum distance of about 10 mm or less, 5 mm or less, or about 3 mm or less. In one or more embodiments, the second glass article is SLG article. In one or more embodiments, the first glass article has a thickness of less than 1.6 mm (e.g., 1.5 mm or less, 1 mm or less, or 0.7 mm or less) and the second glass article has a thickness of 1.6 mm or greater (e.g., 1.8 mm or more, 2.0 mm or greater or 2.1 mm or greater). In one or more embodiments, the first glass article is fusion formed and the second glass article is float formed.

EXAMPLES

Various embodiments will be further clarified by the following examples.

Examples 1-54

Examples 1-54 are glass compositions that were fusion formed into glass articles. The glass compositions (in mol %) of Examples 1-54 are provided in Table 1. Table 1 also includes information related to the temperature (° C.) at 200 poise viscosity, temperature (° C.) at 35 kP viscosity, temperature (° C.) at 200 kP viscosity, density at 20° C., CTE, strain point (° C.), annealing point (° C.), softening point (° C.) and sag temperature, among other properties.

TABLE 1

| Analyzed Composition (mol %) | Examples 1-54. | | | | | |
|---|---|---|---|---|---|---|
| | 1 | 2 | 3 | 4 | 5 | 6 |
| $SiO_2$ | 73.56 | 73.39 | 73.33 | 73.44 | 73.43 | 73.47 |
| $Al_2O_3$ | 7.78 | 8.00 | 7.98 | 8.01 | 7.76 | 7.76 |
| $B_2O_3$ | 6.00 | 7.22 | 6.29 | 6.25 | 6.51 | 6.50 |
| $P_2O_5$ | 2.42 | 2.48 | 2.48 | 2.47 | 2.47 | 2.47 |
| $Li_2O$ | 5.36 | 6.44 | 5.98 | 5.41 | 5.92 | 5.39 |
| $Na_2O$ | 4.82 | 2.40 | 3.88 | 4.35 | 3.85 | 4.35 |
| MgO | 0.01 | 0.01 | 0.01 | 0.01 | 0.01 | 0.01 |
| $SnO_2$ | 0.05 | 0.05 | 0.05 | 0.05 | 0.05 | 0.05 |
| $SiO_2 + Al_2O_3 + B_2O_3 + P_2O_5$ | 89.76 | 91.09 | 90.08 | 90.17 | 90.17 | 90.20 |
| $(Al_2O_3 + P_2O_5)/(Li_2O + Na_2O)$ | 1.00 | 1.19 | 1.06 | 1.07 | 1.05 | 1.05 |
| Fulcher's A coefficient | −2.681 | −3.788 | −3.196 | −2.584 | −2.852 | −3.036 |

TABLE 1-continued

Examples 1-54.

| | | | | | | |
|---|---|---|---|---|---|---|
| Fulcher's B coefficient | 9084.1 | 12326.2 | 10548.4 | 8916.8 | 9640.6 | 10188 |
| Fulcher's $T_o$ coefficient | −93.4 | −268.2 | −175.2 | −64.8 | −126.5 | −161.9 |
| 200 Poise Temperature (° C.) | 1730 | 1756 | 1744 | 1761 | 1744 | 1747 |
| 35000 Poise Temperature (° C.) | 1164 | 1211 | 1188 | 1186 | 1177 | 1182 |
| 200000 Poise Temperature (° C.) | 1045 | 1088 | 1066 | 1066 | 1056 | 1060 |
| Density (g/cm³) | 2.29 | | 2.287 | 2.289 | 2.283 | 2.286 |
| Coefficient of Thermal Expansion × 10⁻⁷ (1/° C.) | | | 50.1 | 51.2 | 49.9 | 51 |
| Strain Pt. (° C.) | 504 | 498 | 495 | 499 | 499 | 499 |
| Anneal Pt. (° C.) | 550 | 549 | 543 | 547 | 546 | 546 |
| Softening Pt. (° C.) | 850 | 833 | 825 | 823 | 821 | 824 |
| $10^{9.9}$ Poise Temperature (° C.) | 692 | 694 | 683 | 685 | 683 | 684 |
| Stress Optical Coefficient (nm/mm/MPa) | 3.535 | 3.626 | 3.53 | 3.546 | 3.592 | 3.529 |
| Refractive Index | 1.4845 | 1.4844 | 1.4855 | 1.4851 | 1.4849 | 1.4846 |
| Poisson's Ratio | 0.198 | | 0.189 | 0.193 | 0.198 | 0.191 |
| Young's modulus (GPa) | 67.7 | | 68.0 | 68.0 | 68.0 | 67.4 |

| Analyzed Composition (mol %) | 7 | 8 | 9 | 10 |
|---|---|---|---|---|
| $SiO_2$ | 73.55 | 73.54 | 73.56 | 73.46 |
| $Al_2O_3$ | 7.51 | 7.52 | 8.02 | 8.01 |
| $B_2O_3$ | 6.72 | 6.71 | 6.18 | 6.21 |
| $P_2O_5$ | 2.45 | 2.46 | 2.42 | 2.42 |
| $Li_2O$ | 5.88 | 5.38 | 4.94 | 4.50 |
| $Na_2O$ | 3.83 | 4.33 | 4.83 | 5.34 |
| MgO | 0.01 | 0.01 | 0.01 | 0.01 |
| $SnO_2$ | 0.05 | 0.05 | 0.05 | 0.05 |
| $SiO_2 + Al_2O_3 + B_2O_3 + P_2O_5$ | 90.23 | 90.23 | 90.18 | 90.10 |
| $(Al_2O_3 + P_2O_5)/(Li_2O + Na_2O)$ | 1.03 | 1.03 | 1.07 | 1.06 |
| Fulcher's A coefficient | −2.232 | −2.55 | −2.775 | −3.528 |
| Fulcher's B coefficient | 7995.5 | 8890.5 | 9496.5 | 11673.5 |
| Fulcher's $T_o$ coefficient | −15.5 | −82.5 | −101.6 | −255.7 |
| 200 Poise Temperature (° C.) | 1748 | 1750 | 1769 | 1747 |
| 35000 Poise Temperature (° C.) | 1164 | 1171 | 1196 | 1190 |
| 200000 Poise Temperature (° C.) | 1046 | 1050 | 1074 | 1066 |
| Density (g/cm³) | 2.281 | 2.283 | 2.291 | 2.292 |
| Coefficient of Thermal Expansion × 10⁻⁷ (1/° C.) | 49.6 | 50.5 | 51.7 | 52.4 |
| Strain Pt. (° C.) | 498 | 497 | 500 | 502 |
| Anneal Pt. (° C.) | 545 | 544 | 548 | 550 |
| Softening Pt. (° C.) | 825 | 825 | 831 | 826 |
| $10^{9.9}$ Poise Temperature (° C.) | 683 | 683 | 688 | 688 |
| Stress Optical Coefficient (nm/mm/MPa) | 3.579 | 3.594 | 3.513 | 3.528 |
| Refractive Index | 1.4844 | 1.4838 | 1.4843 | 1.4839 |
| Poisson's Ratio | 0.201 | 0.2 | 0.192 | 0.196 |
| Young's modulus (GPa) | 67.8 | 67.5 | 67.5 | 67.1 |

| Analyzed Composition (mol %) | 11 | 12 | 13 | 14 | 15 |
|---|---|---|---|---|---|
| $SiO_2$ | 73.70 | 73.57 | 73.68 | 73.62 | 73.49 |
| $Al_2O_3$ | 7.78 | 7.77 | 7.53 | 7.52 | 8.00 |
| $B_2O_3$ | 6.42 | 6.43 | 6.66 | 6.64 | 6.23 |
| $P_2O_5$ | 2.39 | 2.42 | 2.41 | 2.41 | 2.46 |
| $Li_2O$ | 4.82 | 4.44 | 4.84 | 4.41 | 3.92 |
| $Na_2O$ | 4.82 | 5.31 | 4.83 | 5.33 | 5.84 |
| MgO | 0.01 | 0.01 | 0.01 | 0.01 | 0.01 |
| $SnO_2$ | 0.05 | 0.05 | 0.05 | 0.05 | 0.05 |
| $SiO_2 + Al_2O_3 + B_2O_3 + P_2O_5$ | 90.30 | 90.19 | 90.28 | 90.20 | 90.18 |
| $(Al_2O_3 + P_2O_5)/(Li_2O + Na_2O)$ | 1.05 | 1.04 | 1.03 | 1.02 | 1.07 |
| Fulcher's A coefficient | −2.546 | −2.821 | −2.909 | −2.549 | −2.759 |
| Fulcher's B coefficient | 8911.5 | 9622.5 | 9752.6 | 8849.4 | 9518.5 |
| Fulcher's $T_o$ coefficient | −72.8 | −122.8 | −135 | −71.8 | −105.3 |
| 200 Poise Temperature (° C.) | 1766 | 1756 | 1737 | 1753 | 1776 |
| 35000 Poise Temperature (° C.) | 1184 | 1184 | 1174 | 1176 | 1198 |
| 200000 Poise Temperature (° C.) | 1063 | 1062 | 1053 | 1056 | 1076 |
| Density (g/cm³) | 2.288 | 2.289 | 2.284 | 2.287 | 2.295 |
| Coefficient of Thermal Expansion × 10⁻⁷ (1/° C.) | 51.3 | 52.2 | 51.9 | 52.4 | 53.8 |
| Strain Pt. (° C.) | 500 | 499 | 499 | 499 | 498 |
| Anneal Pt. (° C.) | 547 | 546 | 546 | 545 | 546 |
| Softening Pt. (° C.) | 832 | 828 | 829 | 828 | 827 |
| $10^{9.9}$ Poise Temperature (° C.) | 687 | 685 | 685 | 683 | 686 |
| Stress Optical Coefficient (nm/mm/MPa) | 3.549 | 3.572 | 3.559 | 3.599 | 3.551 |
| Refractive Index | 1.4837 | 1.4837 | 1.4836 | 1.4833 | 1.4839 |
| Poisson's Ratio | 0.197 | 0.19 | 0.201 | 0.196 | 0.199 |
| Young's modulus (GPa) | 67.3 | 66.6 | 67.2 | 66.6 | 67.2 |

| Analyzed Composition (mol %) | 16 | 17 | 18 | 19 | 20 |
|---|---|---|---|---|---|
| $SiO_2$ | 73.52 | 73.57 | 73.51 | 73.60 | 73.59 |
| $Al_2O_3$ | 7.99 | 7.76 | 7.76 | 7.51 | 7.51 |

TABLE 1-continued

Examples 1-54.

| | | | | | |
|---|---|---|---|---|---|
| $B_2O_3$ | 6.25 | 6.45 | 6.47 | 6.67 | 6.68 |
| $P_2O_5$ | 2.44 | 2.46 | 2.45 | 2.45 | 2.44 |
| $Li_2O$ | 3.51 | 3.89 | 3.46 | 3.93 | 3.46 |
| $Na_2O$ | 6.23 | 5.80 | 6.29 | 5.76 | 6.27 |
| MgO | 0.01 | 0.01 | 0.01 | 0.01 | 0.01 |
| $SnO_2$ | 0.05 | 0.05 | 0.05 | 0.05 | 0.05 |
| $SiO_2 + Al_2O_3 + B_2O_3 + P_2O_5$ | 90.20 | 90.24 | 90.19 | 90.24 | 90.21 |
| $(Al_2O_3 + P_2O_5)/(Li_2O + Na_2O)$ | 1.07 | 1.05 | 1.05 | 1.03 | 1.02 |
| Fulcher's A coefficient | −3.258 | −2.626 | −2.888 | −3.405 | −2.364 |
| Fulcher's B coefficient | 10923.2 | 9139.9 | 9891.9 | 11375.6 | 8509.9 |
| Fulcher's $T_o$ coefficient | −206.4 | −90.8 | −142.9 | −248.8 | −56.2 |
| 200 Poise Temperature (° C.) | 1759 | 1764 | 1763 | 1745 | 1768 |
| 35000 Poise Temperature (° C.) | 1194 | 1184 | 1188 | 1182 | 1176 |
| 200000 Poise Temperature (° C.) | 1070 | 1062 | 1065 | 1058 | 1054 |
| Density (g/cm³) | 2.298 | 2.292 | 2.297 | 2.291 | 2.295 |
| Coefficient of Thermal Expansion × $10^{-7}$ (1/° C.) | 54.3 | 53.2 | 54.3 | 53.9 | 54.4 |
| Strain Pt. (° C.) | 501 | 503 | 497 | 497 | 499 |
| Anneal Pt. (° C.) | 549 | 550 | 544 | 544 | 545 |
| Softening Pt. (° C.) | 828 | 830 | 826 | 824 | 823 |
| $10^{9.9}$ Poise Temperature (° C.) | 688 | 688 | 683 | 682 | 681 |
| Stress Optical Coefficient (nm/mm/MPa) | 3.556 | | 3.562 | 3.568 | 3.577 |
| Refractive Index | 1.4836 | | 1.4834 | 1.4833 | 1.4831 |
| Poisson's Ratio | 0.204 | | 0.196 | 0.199 | 0.199 |
| Young's modulus (GPa) | 66.9 | | 66.5 | 66.5 | 66.5 |

| Analyzed Composition (mol %) | 21 | 22 | 23 | 24 | 25 |
|---|---|---|---|---|---|
| $SiO_2$ | 71.59 | 71.54 | 71.59 | 71.63 | 71.62 |
| $Al_2O_3$ | 8.02 | 8.01 | 8.02 | 8.04 | 8.03 |
| $B_2O_3$ | 8.17 | 8.19 | 8.16 | 8.18 | 8.16 |
| $P_2O_5$ | 2.45 | 2.45 | 2.45 | 2.45 | 2.44 |
| $Li_2O$ | 5.87 | 5.42 | 4.92 | 4.38 | 3.95 |
| $Na_2O$ | 3.83 | 4.32 | 4.78 | 5.26 | 5.73 |
| MgO | 0.02 | 0.01 | 0.01 | 0.01 | 0.01 |
| $SnO_2$ | 0.05 | 0.05 | 0.05 | 0.05 | 0.05 |
| $SiO_2 + Al_2O_3 + B_2O_3 + P_2O_5$ | 90.24 | 90.19 | 90.23 | 90.29 | 90.25 |
| $(Al_2O_3 + P_2O_5)/(Li_2O + Na_2O)$ | 1.08 | 1.07 | 1.08 | 1.09 | 1.08 |
| Fulcher's A coefficient | −2.982 | −2.418 | −2.344 | −2.92 | −3.058 |
| Fulcher's B coefficient | 9818.4 | 8367.8 | 8267.4 | 9793.3 | 10192.8 |
| Fulcher's $T_o$ coefficient | −151.9 | −57.3 | −47.3 | −157.3 | −191 |
| 200 Poise Temperature (° C.) | 1707 | 1716 | 1733 | 1718 | 1711 |
| 35000 Poise Temperature (° C.) | 1153 | 1145 | 1153 | 1155 | 1150 |
| 200000 Poise Temperature (° C.) | 1033 | 1027 | 1034 | 1034 | 1028 |
| Density (g/cm³) | 2.283 | 2.285 | 2.287 | 2.289 | 2.291 |
| Coefficient of Thermal Expansion × $10^{-7}$ (1/° C.) | 50 | 51.3 | 52.5 | 53.3 | 53.9 |
| Strain Pt. (° C.) | 487 | 485 | 485 | 485 | 487 |
| Anneal Pt. (° C.) | 532 | 529 | 530 | 530 | 533 |
| Softening Pt. (° C.) | 791 | 790 | 794 | 793 | 796 |
| $10^{9.9}$ Poise Temperature (° C.) | 662 | 685 | 661 | 660 | 665 |
| Stress Optical Coefficient (nm/mm/MPa) | 3.55 | 3.583 | 3.651 | 3.592 | 3.609 |
| Refractive Index | 1.48604 | 1.485791 | 1.485331 | 1.484909 | 1.484621 |
| Poisson's Ratio | 0.202 | 0.205 | 0.202 | 0.202 | 0.199 |
| Young's modulus (GPa) | 67.1 | 67.0 | 66.3 | 66.3 | 65.7 |

| Analyzed Composition (mol %) | 26 | 27 | 28 | 29 | 30 |
|---|---|---|---|---|---|
| $SiO_2$ | 71.74 | 71.18 | 70.76 | 71.74 | 71.67 |
| $Al_2O_3$ | 8.05 | 8.05 | 8.05 | 8.05 | 8.05 |
| $B_2O_3$ | 8.11 | 8.61 | 9.06 | 8.55 | 9.11 |
| $P_2O_5$ | 2.44 | 2.41 | 2.41 | 1.92 | 1.44 |
| $Li_2O$ | 3.38 | 4.39 | 4.38 | 4.41 | 4.38 |
| $Na_2O$ | 6.21 | 5.29 | 5.28 | 5.28 | 5.28 |
| MgO | 0.01 | 0.01 | 0.01 | 0.00 | 0.01 |
| $SnO_2$ | 0.05 | 0.05 | 0.05 | 0.05 | 0.05 |
| $SiO_2 + Al_2O_3 + B_2O_3 + P_2O_5$ | 90.35 | 90.26 | 90.29 | 90.26 | 90.28 |
| $(Al_2O_3 + P_2O_5)/(Li_2O + Na_2O)$ | 1.09 | 1.08 | 1.08 | 1.03 | 0.98 |
| Fulcher's A coefficient | −3.031 | −2.929 | −2.583 | −3.094 | −2.681 |
| Fulcher's B coefficient | 10206.3 | 9792.6 | 8892.2 | 10414.9 | 9202.6 |
| Fulcher's $T_o$ coefficient | −185.4 | −164.9 | −104.7 | −212.9 | −140.6 |
| 200 Poise Temperature (° C.) | 1729 | 1707 | 1716 | 1718 | 1707 |
| 35000 Poise Temperature (° C.) | 1162 | 1145 | 1143 | 1151 | 1133 |
| 200000 Poise Temperature (° C.) | 1040 | 1025 | 1023 | 1028 | 1012 |
| Density (g/cm³) | 2.294 | 2.288 | 2.286 | 2.291 | 2.291 |
| Coefficient of Thermal Expansion × $10^{-7}$ (1/° C.) | 54.7 | | | | |
| Strain Pt. (° C.) | 489 | 485 | 481 | 488 | 487 |
| Anneal Pt. (° C.) | 534 | 529 | 525 | 532 | 531 |
| Softening Pt. (° C.) | 801 | 797 | 785 | 794 | 784 |
| $10^{9.9}$ Poise Temperature (° C.) | 666 | 660 | 654 | 661 | 658 |

TABLE 1-continued

Examples 1-54.

| | | | | | |
|---|---|---|---|---|---|
| Stress Optical Coefficient (nm/mm/MPa) | 3.586 | 3.62 | 3.63 | 3.584 | 3.629 |
| Refractive Index | 1.484602 | 1.4848 | 1.4851 | 1.4852 | 1.4872 |
| Poisson's Ratio | 0.199 | 0.205 | 0.204 | 0.201 | 0.191 |
| Young's modulus (GPa) | 65.6 | 66.0 | 65.6 | 66.5 | 66.4 |

| Analyzed Composition (mol %) | 31 | 32 | 33 | 34 | 35 |
|---|---|---|---|---|---|
| $SiO_2$ | 70.62 | 70.75 | 71.62 | 71.69 | 71.18 |
| $Al_2O_3$ | 9.07 | 9.08 | 8.03 | 8.04 | 8.04 |
| $B_2O_3$ | 8.53 | 8.09 | 8.15 | 8.08 | 8.60 |
| $P_2O_5$ | 1.44 | 1.44 | 2.44 | 2.44 | 2.45 |
| $Li_2O$ | 4.43 | 4.35 | 1.72 | 0.00 | 1.72 |
| $Na_2O$ | 5.84 | 6.24 | 7.98 | 9.69 | 7.95 |
| MgO | 0.01 | 0.01 | 0.01 | 0.01 | 0.01 |
| $SnO_2$ | 0.05 | 0.05 | 0.05 | 0.05 | 0.05 |
| $SiO_2 + Al_2O_3 + B_2O_3 + P_2O_5$ | 89.67 | 89.35 | 90.24 | 90.25 | 90.27 |
| $(Al_2O_3 + P_2O_5)/(Li_2O + Na_2O)$ | 1.02 | 0.99 | 1.08 | 1.08 | 1.08 |
| Fulcher's A coefficient | −2.98 | −3.429 | −2.923 | −2.73 | −3.11 |
| Fulcher's B coefficient | 9909.6 | 11194.2 | 10067.4 | 9361.9 | 10552.1 |
| Fulcher's $T_o$ coefficient | −162.9 | −255.4 | −163.3 | −91.9 | −205.5 |
| 200 Poise Temperature (° C.) | 1714 | 1698 | 1764 | 1769 | 1745 |
| 35000 Poise Temperature (° C.) | 1154 | 1149 | 1185 | 1195 | 1173 |
| 200000 Poise Temperature (° C.) | 1034 | 1027 | 1061 | 1074 | 1049 |
| Density (g/cm³) | 2.301 | 2.31 | 2.302 | 2.301 | 2.301 |
| Coefficient of Thermal Expansion × $10^{-7}$ (1/° C.) | | | 56.9 | 59.3 | 57.7 |
| Strain Pt. (° C.) | 495 | 492 | 498 | 518 | 493 |
| Anneal Pt. (° C.) | 539 | 536 | 545 | 566 | 539 |
| Softening Pt. (° C.) | | | 813 | 832 | 804 |
| $10^{9.9}$ Poise Temperature (° C.) | | | 680 | 702 | 672 |
| Stress Optical Coefficient (nm/mm/MPa) | 3.574 | 3.548 | 3.629 | 3.662 | 3.624 |
| Refractive Index | 1.4887 | 1.4895 | 1.4833 | 1.4819 | 1.4831 |
| Poisson's Ratio | 0.208 | 0.204 | 0.197 | 0.202 | 0.198 |
| Young's modulus (GPa) | 67.2 | 68.0 | 63.9 | 62.0 | 62.0 |

| Analyzed Composition (mol %) | 36 | 37 | 38 | 39 | 40 |
|---|---|---|---|---|---|
| $SiO_2$ | 71.21 | 70.72 | 70.78 | 70.76 | 70.82 |
| $Al_2O_3$ | 8.04 | 8.05 | 8.05 | 8.04 | 8.08 |
| $B_2O_3$ | 8.55 | 9.11 | 9.02 | 9.09 | 9.05 |
| $P_2O_5$ | 2.45 | 2.43 | 2.43 | 2.44 | 2.43 |
| $Li_2O$ | 0.00 | 1.75 | 0.00 | 3.35 | 3.36 |
| $Na_2O$ | 9.68 | 7.88 | 9.67 | 6.25 | 6.16 |
| MgO | 0.00 | 0.01 | 0.01 | 0.01 | 0.01 |
| $SnO_2$ | 0.05 | 0.05 | 0.05 | 0.05 | 0.10 |
| $SiO_2 + Al_2O_3 + B_2O_3 + P_2O_5$ | 90.26 | 90.32 | 90.27 | 90.34 | 90.37 |
| $(Al_2O_3 + P_2O_5)/(Li_2O + Na_2O)$ | 1.08 | 1.09 | 1.08 | 1.09 | 1.10 |
| Fulcher's A coefficient | −2.727 | −2.991 | −2.872 | −2.797 | −2.8 |
| Fulcher's B coefficient | 9355 | 10153.6 | 9716.8 | 9562.4 | 9422.4 |
| Fulcher's $T_o$ coefficient | −98.5 | −191.1 | −131.9 | −158.3 | −149.3 |
| 200 Poise Temperature (° C.) | 1762 | 1728 | 1746 | 1717 | 1698 |
| 35000 Poise Temperature (° C.) | 1188 | 1156 | 1178 | 1144 | 1134 |
| 200000 Poise Temperature (° C.) | 1067 | 1033 | 1057 | 1023 | 1014 |
| Density (g/cm³) | 2.309 | 2.299 | 2.307 | 2.291 | 2.292 |
| Coefficient of Thermal Expansion × $10^{-7}$ (1/° C.) | 59.4 | 57.3 | 59.5 | 55.1 | 54.5 |
| Strain Pt. (° C.) | 514 | 488 | 511 | 484 | 483 |
| Anneal Pt. (° C.) | 562 | 534 | 559 | 529 | 528 |
| Softening Pt. (° C.) | 826 | 794 | 821 | 793 | 791 |
| $10^{9.9}$ Poise Temperature (° C.) | 697 | 665 | 693 | 660 | 659 |
| Stress Optical Coefficient (nm/mm/MPa) | 3.717 | 3.649 | 3.679 | 3.625 | 3.64 |
| Refractive Index | 1.4824 | 1.483 | 1.4823 | 1.4846 | 1.4847 |
| Poisson's Ratio | 0.204 | 0.201 | 0.202 | 0.2 | 0.207 |
| Young's modulus (GPa) | 61.7 | 63.4 | 61.2 | 64.7 | 65.2 |

| Analyzed Composition (mol %) | 41 | 42 | 43 | 44 | 45 |
|---|---|---|---|---|---|
| $SiO_2$ | 70.63 | 70.69 | 71.66 | 71.78 | 70.54 |
| $Al_2O_3$ | 8.06 | 8.06 | 8.04 | 8.07 | 9.03 |
| $B_2O_3$ | 9.14 | 9.02 | 8.12 | 8.06 | 8.21 |
| $P_2O_5$ | 2.44 | 2.43 | 2.45 | 2.43 | 1.47 |
| $Li_2O$ | 3.42 | 3.40 | 4.34 | 3.85 | 3.40 |
| $Na_2O$ | 6.15 | 6.19 | 5.29 | 5.70 | 7.25 |
| MgO | 0.01 | 0.01 | 0.01 | 0.01 | 0.01 |
| $SnO_2$ | 0.15 | 0.19 | 0.10 | 0.10 | 0.10 |
| $SiO_2 + Al_2O_3 + B_2O_3 + P_2O_5$ | 90.26 | 90.20 | 90.26 | 90.34 | 89.24 |
| $(Al_2O_3 + P_2O_5)/(Li_2O + Na_2O)$ | 1.10 | 1.09 | 1.09 | 1.10 | 0.99 |
| Fulcher's A coefficient | −3.162 | −2.545 | −3.121 | −2.664 | |
| Fulcher's B coefficient | 10471.2 | 8727.7 | 10516.9 | 9158.5 | |
| Fulcher's $T_o$ coefficient | −211.3 | −84.9 | −207.9 | −113 | |

TABLE 1-continued

Examples 1-54.

| | | | | | |
|---|---|---|---|---|---|
| 200 Poise Temperature (° C.) | 1705 | 1716 | 1732 | 1732 | |
| 35000 Poise Temperature (° C.) | 1148 | 1146 | 1164 | 1158 | |
| 200000 Poise Temperature (° C.) | 1026 | 1027 | 1041 | 1037 | |
| Density (g/cm³) | 2.295 | 2.295 | 2.291 | 2.294 | 2.316 |
| Coefficient of Thermal Expansion × $10^{-7}$ (1/° C.) | 54.7 | 54.7 | 52.7 | 53.7 | |
| Strain Pt. (° C.) | 483 | 486 | 487 | 488 | |
| Anneal Pt. (° C.) | 528 | 531 | 532 | 534 | |
| Softening Pt. (° C.) | 788 | 797 | 797 | 797 | |
| $10^{9.9}$ Poise Temperature (° C.) | 658 | 663 | 664 | 666 | |
| Stress Optical Coefficient (nm/mm/MPa) | 3.616 | 3.664 | 3.614 | 3.612 | |
| Refractive Index | 1.485 | 1.4852 | 1.4847 | 1.4848 | |
| Poisson's Ratio | 0.196 | 0.208 | 0.203 | 0.205 | |
| Young's modulus (GPa) | 64.9 | 64.9 | 66.5 | 66.2 | |

| Analyzed Composition (mol %) | 46 | 47 | 48 | 49 | 50 |
|---|---|---|---|---|---|
| $SiO_2$ | 70.47 | 70.58 | 70.62 | 70.55 | 70.63 |
| $Al_2O_3$ | 9.04 | 9.04 | 9.06 | 9.06 | 9.04 |
| $B_2O_3$ | 8.23 | 7.29 | 7.27 | 7.28 | 7.24 |
| $P_2O_5$ | 1.47 | 1.46 | 1.46 | 1.46 | 1.47 |
| $Li_2O$ | 3.95 | 2.92 | 3.37 | 3.91 | 4.35 |
| $Na_2O$ | 6.73 | 8.60 | 8.13 | 7.63 | 7.16 |
| MgO | 0.01 | 0.01 | 0.01 | 0.01 | 0.01 |
| $SnO_2$ | 0.10 | 0.10 | 0.10 | 0.10 | 0.10 |
| $SiO_2 + Al_2O_3 + B_2O_3 + P_2O_5$ | 89.21 | 88.37 | 88.40 | 88.35 | 88.38 |
| $(Al_2O_3 + P_2O_5)/(Li_2O + Na_2O)$ | 0.98 | 0.91 | 0.91 | 0.91 | 0.91 |
| Fulcher's A coefficient | | | | | |
| Fulcher's B coefficient | | | | | |
| Fulcher's $T_o$ coefficient | | | | | |
| 200 Poise Temperature (° C.) | | | | | |
| 35000 Poise Temperature (° C.) | | | | | |
| 200000 Poise Temperature (° C.) | | | | | |
| Density (g/cm³) | 2.314 | 2.336 | 2.334 | 2.329 | 2.327 |
| Coefficient of Thermal Expansion × $10^{-7}$ (1/° C.) | | | | | |
| Strain Pt. (° C.) | | | | | |
| Anneal Pt. (° C.) | | | | | |
| Softening Pt. (° C.) | | | | | |
| $10^{9.9}$ Poise Temperature (° C.) | | | | | |
| Stress Optical Coefficient (nm/mm/MPa) | | | | | |
| Refractive Index | | | | | |
| Poisson's Ratio | | | | | |
| Young's modulus (GPa) | | | | | |

| Analyzed Composition (mol %) | 51 | 52 | 53 | 54 |
|---|---|---|---|---|
| $SiO_2$ | 71.20 | 71.05 | 70.60 | 73.84 |
| $Al_2O_3$ | 8.24 | 8.07 | 8.07 | 8.14 |
| $B_2O_3$ | 8.11 | 8.71 | 9.13 | 6.53 |
| $P_2O_5$ | 2.48 | 2.47 | 2.49 | 2.52 |
| $Li_2O$ | 4.53 | 3.66 | 3.38 | 6.45 |
| $Na_2O$ | 5.37 | 5.91 | 6.19 | 2.46 |
| MgO | 0.01 | 0.01 | 0.01 | |
| $SnO_2$ | 0.06 | 0.12 | 0.13 | 0.06 |
| $SiO_2 + Al_2O_3 + B_2O_3 + P_2O_5$ | 90.03 | 90.30 | 90.29 | 91.03 |
| $(Al_2O_3 + P_2O_5)/(Li_2O + Na_2O)$ | 1.08 | 1.10 | 1.10 | 1.20 |
| Fulcher's A coefficient | -2.982 | -3.937 | -2.67 | -4.026 |
| Fulcher's B coefficient | 10031 | 13308 | 9250.1 | 12964.4 |
| Fulcher's $T_o$ coefficient | -173 | -394.3 | -128 | -294.4 |
| 200 Poise Temperature (° C.) | 1726 | 1739 | 1733 | 1755 |
| 35000 Poise Temperature (° C.) | 1160 | 1175 | 1154 | 1218 |
| 200000 Poise Temperature (° C.) | 1038 | 1046 | 1032 | 1096 |
| Density (g/cm³) | 2.285 | 2.295 | 2.287 | 2.272 |
| Coefficient of Thermal Expansion × $10^{-7}$ (1/° C.) | 53.5 | 54.3 | 54.7 | 45.6 |
| Strain Pt. (° C.) | 482 | 483 | 477 | 497 |
| Anneal Pt. (° C.) | 526 | 529 | 522 | 547 |
| Softening Pt. (° C.) | 805 | 796 | 788 | 859 |
| $10^{9.9}$ Poise Temperature (° C.) | 660 | 662 | 653 | 698 |
| Stress Optical Coefficient (nm/mm/MPa) | 3.762 | | 3.605 | 3.563 |
| Refractive Index | 1.4856 | 1.4855 | 1.4854 | |
| Poisson's Ratio | 0.204 | 0.201 | 0.201 | 0.195 |
| Young's modulus (GPa) | 66.6 | 65.4 | 65.2 | 67.7 |

Examples 3-10, 15-18, and 21-26 were fusion formed into glass articles having various thicknesses and then chemically strengthened using the separate ion exchange conditions as provided in Table 2. The resulting surface CS (MPa) and DOC (micrometers) values of the strengthened glass articles after chemical strengthening are also shown in Table 2. In Examples 3-10, 15-18, and 21-26, both potassium and sodium ions are exchanged into the glass article. Accordingly, the "SCALP compression depth layer" is the DOC of each glass article as measured by SCALP (and indicates the depth of sodium). The "FSM surface spike depth" value provided in Table 2 indicates the exchange depth of potassium ions (which indicates a change in the magnitude of the compressive stress but not the change in stress from compressive to tensile). CT is measured by SCALP.

TABLE 2

Examples 3-10, 15-18, and 21-26.

| Glass Composition | 3 | 4 | 5 | 6 | 7 |
|---|---|---|---|---|---|
| Thickness (mm) | 1 | 1 | 1 | 1 | 1 |
| Time (h) | 2 | 2 | 2 | 2 | 2 |
| Temperature (° C.) | 390 | 390 | 390 | 390 | 390 |
| bath (% $KNO_3$/% $NaNO_3$) | 95/5 | 95/5 | 95/5 | 95/5 | 95/5 |
| FSM Surface Compressive Stress (MPa) | 387 | 394 | 385 | 374 | 363 |
| FSM Surface Spike Depth (microns) | 6 | 7 | 6 | 7 | 6 |
| SCALP Central Tension (MPa) | 9 | 10 | 8 | 8 | 6 |
| SCALP Compressive Layer Depth (microns) | 140 | 150 | 130 | 130 | 130 |
| Thickness (mm) | 1 | 1 | 1 | 1 | 1 |
| Time (h) | 4 | 4 | 4 | 4 | 4 |
| Temperature (° C.) | 390 | 390 | 390 | 390 | 390 |
| bath (% $KNO_3$/% $NaNO_3$) | 95/5 | 95/5 | 95/5 | 95/5 | 95/5 |
| FSM Surface Compressive Stress (MPa) | 394 | 394 | 382 | 382 | 357 |
| FSM Surface Spike Depth (microns) | 8 | 10 | 10 | 10 | 10 |
| SCALP Central Tension (MPa) | 14 | 13 | 11 | 10 | 9 |
| SCALP Compressive Layer Depth (microns) | 160 | 140 | 140 | 120 | 130 |

| Glass Composition | 8 | 9 | 10 | 15 | 16 |
|---|---|---|---|---|---|
| Thickness (mm) | 1 | 1.01 | 1 | 1.08 | 1.1 |
| Time (h) | 2 | 2 | 2 | 2 | 2 |
| Temperature (° C.) | 390 | 390 | 390 | 390 | 390 |
| bath (% $KNO_3$/% $NaNO_3$) | 95/5 | 95/5 | 95/5 | 95/5 | 95/5 |
| FSM Surface Compressive Stress (MPa) | 360 | 396 | 407 | 401 | 395 |
| FSM Surface Spike Depth (microns) | 7 | 8 | 8 | 9 | 9 |
| SCALP Central Tension (MPa) | 6 | 8.83 | 8.66 | 7.55 | 5.56 |
| SCALP Compressive Layer Depth (microns) | 130 | 130 | 140 | 150 | 150 |
| Thickness (mm) | 1 | 1.01 | 1.01 | 1.07 | 1.06 |
| Time (h) | 4 | 4 | 4 | 4 | 4 |
| Temperature (° C.) | 390 | 390 | 390 | 390 | 390 |
| bath (% $KNO_3$/% $NaNO_3$) | 95/5 | 95/5 | 95/5 | 95/5 | 95/5 |
| FSM Surface Compressive Stress (MPa) | 372 | 394 | 393 | 397 | 397 |
| FSM Surface Spike Depth (microns) | 10 | 11 | 11 | 13 | 13 |
| SCALP Central Tension (MPa) | 10 | 11.44 | 11.42 | 11.03 | 8.16 |
| SCALP Compressive Layer Depth (microns) | 110 | 160 | 150 | 150 | 150 |

| Glass Composition | 17 | 18 | 21 | 22 |
|---|---|---|---|---|
| Thickness (mm) | 1.1 | 1.1 | 1.03 | 1.03 |
| Time (h) | 2 | 2 | 2 | 2 |
| Temperature (° C.) | 390 | 390 | 390 | 390 |
| bath (% $KNO_3$/% $NaNO_3$) | 95/5 | 95/5 | 95/5 | 95/5 |
| FSM Surface Compressive Stress (MPa) | 390 | 371 | 419 | 406 |
| FSM Surface Spike Depth (microns) | 9 | 9 | 6 | 6 |
| SCALP Central Tension (MPa) | 5.64 | 6.13 | 7.26 | 10.22 |
| SCALP Compressive Layer Depth (microns) | 150 | 160 | 170 | 180 |
| Thickness (mm) | 1.09 | 1.09 | 1.07 | 1.04 |
| Time (h) | 4 | 4 | 4 | 4 |
| Temperature (° C.) | 390 | 390 | 390 | 390 |
| bath (% $KNO_3$/% $NaNO_3$) | 95/5 | 95/5 | 95/5 | 95/5 |
| FSM Surface Compressive Stress (MPa) | 389 | 373 | 397 | 398 |
| FSM Surface Spike Depth (microns) | 13 | 12 | 8 | 8 |
| SCALP Central Tension (MPa) | 8.13 | 7.82 | 8.83 | 10.69 |
| SCALP Compressive Layer Depth (microns) | 140 | 160 | 160 | 170 |

TABLE 2-continued

Examples 3-10, 15-18, and 21-26.

| Glass Composition | 23 | 24 | 25 | 26 |
|---|---|---|---|---|
| Thickness (mm) | 1.03 | 0.96 | 0.94 | 0.95 |
| Time (h) | 2 | 2 | 2 | 2 |
| Temperature (° C.) | 390 | 390 | 390 | 390 |
| bath (% $KNO_3$/% $NaNO_3$) | 95/5 | 95/5 | 95/5 | 95/5 |
| FSM Surface Compressive Stress (MPa) | 386 | 396 | 372 | 406 |
| FSM Surface Spike Depth (microns) | 6 | 6 | 7 | 8 |
| SCALP Central Tension (MPa) | 7.56 | 7.41 | 7.34 | 8.9 |
| SCALP Compressive Layer Depth (microns) | 150 | 160 | 140 | 140 |
| Thickness (mm) | 1.02 | 0.92 | 0.93 | 0.94 |
| Time (h) | 4 | 4 | 4 | 4 |
| Temperature (° C.) | 390 | 390 | 390 | 390 |
| bath (% $KNO_3$/% $NaNO_3$) | 95/5 | 95/5 | 95/5 | 95/5 |
| FSM Surface Compressive Stress (MPa) | 388 | 386 | 384 | 387 |
| FSM Surface Spike Depth (microns) | 9 | 9 | 11 | 11 |
| SCALP Central Tension (MPa) | 9.86 | 9.69 | 8.99 | 8.77 |
| SCALP Compressive Layer Depth (microns) | 160 | 140 | 170 | 150 |

Figure 9:
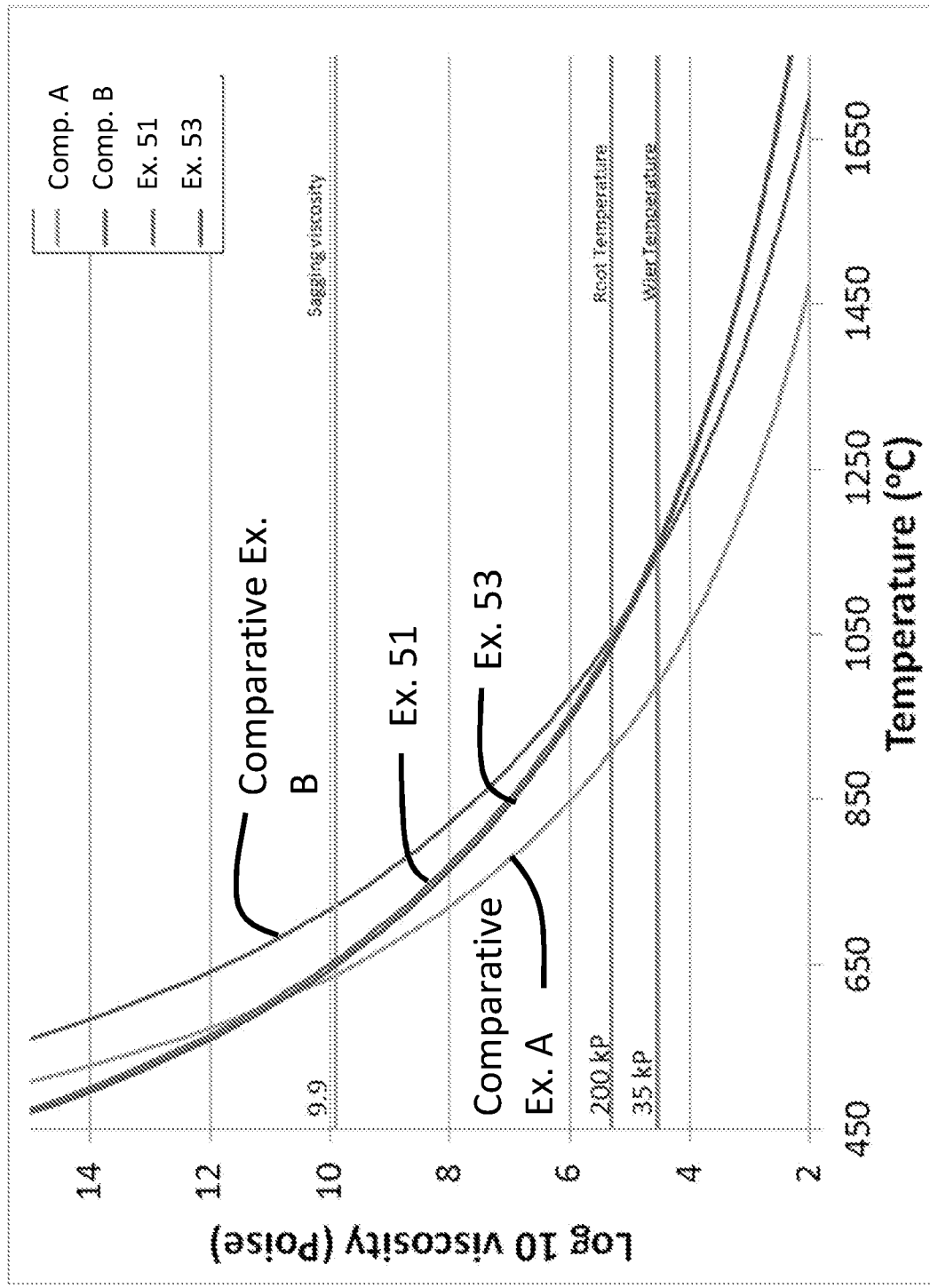
FIG. 9 is a graph showing the log viscosity curves of Examples 51 and 53.

FIG. 9 is a log viscosity curve as a function of temperature for Examples 51 and 53, a known float-formed SLG article (Comparative Example A) and a known fusion-formed aluminosilicate glass article (Comparative Example B). Examples 51 and 53 exhibited the same temperatures as the known aluminosilicate glass article in the forming regimes (e.g., at 35 kP and 200 kP) while exhibiting a sag temperature that is similar to the SLG article at a viscosity of $10^{9.9}$ poise. Accordingly, Examples 51 and 53 are fusion formable and can be pair sagged with a glass article that differs in both composition and forming method.

Aspect (1) of this disclosure pertains to a glass article comprising a glass composition, the glass composition comprising: $SiO_2$ in an amount in a range from about 66 mol % to about 80 mol %; $Al_2O_3$ in an amount in a range from about 2 mol % to about 16 mol %; $B_2O_3$ in an amount in a range from about 0.9 mol % to about 15 mol %; $P_2O_5$ in a non-zero amount up to and including 7.5 mol %; $Li_2O$ in an amount from about 0.5 mol % to about 12 mol %; and $Na_2O$ in an amount from about 6 mol % to about 15 mol %.

Aspect (2) of this disclosure pertains to the glass article of Aspect (1), wherein $SiO_2$ is present in an amount from about 70 mol % to about 80 mol %, and $Al_2O_3$ is present in an amount from about 7 mol % to about 15 mol %.

Aspect (3) of this disclosure pertains to the glass article of Aspect (1) or Aspect (2), further comprising a total amount of $SiO_2$, $Al_2O_3$, $B_2O_3$ and $P_2O_5$ greater than about 88 mol %.

Aspect (4) of this disclosure pertains to the glass article of any one of Aspects (1) through Aspect (3), further comprising a compositional relationship (in mol %) of $0.9 < (Al_2O_3 + P_2O_5)/(Li_2O + Na_2O) \leq 1.20$.

Aspect (5) of this disclosure pertains to the glass article of any one of Aspects (1) through Aspect (4), wherein the glass article is strengthened.

Aspect (6) of this disclosure pertains to the glass article of any one of Aspects (1) through Aspect (5), wherein the glass article is fusion formed.

Aspect (7) of this disclosure pertains to an aluminosilicate glass article comprising: a glass composition comprising $SiO_2$ in an amount of about 66 mol % or greater; and a sag temperature in a range from about 600° C. to about 700° C.

Aspect (8) of this disclosure pertains to the aluminosilicate glass article of Aspect (7), where the glass composition further comprises $Al_2O_3$ in an amount greater than 2 mol %.

Aspect (9) of this disclosure pertains to the aluminosilicate glass article of Aspect (7) or Aspect (8), wherein the glass composition further comprises an alkali metal oxide selected from $Li_2O$, $Na_2O$ and $K_2O$, wherein the alkali metal oxide is present in an amount greater than about 5 mol %.

Aspect (10) of this disclosure pertains to the aluminosilicate glass article of any one of Aspects (7) through (9), wherein the glass composition further comprises a total amount of amount of alkali metal oxides ($R_2O=Li_2O+Na_2O+K_2O$) in a range from about 5 mol % to about 20 mol %.

Aspect (11) of this disclosure pertains to the aluminosilicate glass article of any one of Aspects (7) through (10), further comprising a temperature at a viscosity of 35 kilopoise of greater than about 1000° C.

Aspect (12) of this disclosure pertains to the aluminosilicate glass article of any one of Aspects (7) through (11), further comprising a temperature at a viscosity of 200 kilopoise of greater than about 900° C.

Aspect (13) of this disclosure pertains to the aluminosilicate glass article of any one of Aspects (7) through (12), further comprising an anneal point of less than about 570°.

Aspect (14) of this disclosure pertains to the aluminosilicate glass article of any one of Aspects (7) through (13), further comprising a strain point of less than about 520° C.

Aspect (15) of this disclosure pertains to the aluminosilicate glass article of any one of Aspects (7) through (14), further comprising a density of about 2.5 g/cm³ or less.

Aspect (16) of this disclosure pertains to the aluminosilicate glass article of any one of Aspects (7) through (15), further comprising a softening point in a range from about 725° C. and 860° C.

Aspect (17) of this disclosure pertains to the aluminosilicate glass article of any one of Aspects (7) through (16), wherein the glass article is strengthened.

Aspect (18) of this disclosure pertains to the aluminosilicate glass article of any one of Aspects (7) through (17), wherein the glass article is fusion formed.

Aspect (19) of this disclosure pertains to a vehicle comprising: a body defining an interior and an opening in communication with the interior; a glass article disposed in the opening, the article comprising a difference between the annealing point (° C.) and the softening point (° C.) of greater than about 150° C.

Aspect (20) of this disclosure pertains to the vehicle of Aspect (19), wherein the glass article comprises a glass composition, the glass composition comprising $SiO_2$ in an amount of about 66 mol % or greater, and a sag temperature in a range from about 600° C. to about 700° C.

Aspect (21) of this disclosure pertains to the vehicle of Aspect (19) or Aspect (20), where the glass composition further comprises $Al_2O_3$ in an amount greater than 2 mol %.

Aspect (22) of this disclosure pertains to the vehicle of any one of Aspects (19) through (21), wherein the glass composition further comprises an alkali metal oxide selected from $Li_2O$, $Na_2O$ and $K_2O$, wherein the alkali metal oxide is present in an amount greater than about 5 mol %.

Aspect (23) of this disclosure pertains to the vehicle of any one of Aspects (19) through (22), wherein the glass composition further comprises a total amount of amount of alkali metal oxides ($R_2O=Li_2O+Na_2O+K_2O$) in a range from about 5 mol % to about 20 mol %.

Aspect (24) of this disclosure pertains to the vehicle of any one of Aspects (19) through (23), wherein the glass article further comprises a temperature at a viscosity of 35 kilopoise of greater than about 1000° C.

Aspect (25) of this disclosure pertains to the vehicle of any one of Aspects (19) through (24), wherein the glass article further comprises a temperature at a viscosity of 200 kilopoise of greater than about 900° C.

Aspect (26) of this disclosure pertains to the vehicle of any one of Aspects (19) through (25), herein the glass article further comprises an anneal point of less than about 570° C.

Aspect (27) of this disclosure pertains to the vehicle of any one of Aspects (19) through (26), wherein the glass article further comprises a strain point of less than about 520° C.

Aspect (28) of this disclosure pertains to the vehicle of any one of Aspects (19) through (27), wherein the glass article further comprises a density of about 2.5 g/cm³ or less.

Aspect (29) of this disclosure pertains to the vehicle of any one of Aspects (19) through (28), wherein the glass article further comprises a softening point is in a range from about 725° C. and 860° C.

Aspect (30) of this disclosure pertains to the vehicle of any one of Aspects (19) through (29), wherein the glass article is strengthened.

Aspect (31) of this disclosure pertains to the vehicle of any one of Aspects (19) through (30), wherein the glass article further is fusion formed.

Aspect (32) of this disclosure pertains to a laminate comprising: a first glass layer; an interlayer disposed on the first glass layer; and a second glass layer disposed on the interlayer opposite the first glass layer wherein either one or both the first glass layer and the second glass layer comprises the glass article according to any one of Aspects (1) through (18).

Aspect (33) of this disclosure pertains to the laminate of Aspect (32), wherein either one of or both the first glass layer and the second glass layer comprise a thickness less than about 1.6 mm.

Aspect (34) of this disclosure pertains to the laminate of Aspect (32) or Aspect (33), wherein the first glass layer comprises the glass article according to any one of Aspects (1) through (18) and the second glass layer comprises a soda lime silicate glass article.

Aspect (35) of this disclosure pertains to the laminate of any one of Aspects (32) through (34), herein the first glass layer comprises a thickness of less than about 1.6 mm, and the second glass layer comprises a thickness of 1.6 or greater.

Aspect (36) of this disclosure pertains to a method for forming a laminate comprising: stacking a first glass article according to any one of Aspects (1) through (18), and a second glass article having a different composition from the first glass article to form a stack, wherein the first glass layer comprises a first surface and an second surface that opposes the first surface, and the second glass article comprises a third surface and a fourth surface that opposes the third surface, and wherein the second surface is adjacent to the third surface; placing the stack on a mold; heating the stack to a temperature at which the second glass article exhibits a viscosity of $10^{9.9}$ poise to form a shaped stack; and placing an interlayer between the first glass article and the second glass layer.

Aspect (37) of this disclosure pertains to the method of Aspect (36), wherein the shaped stack comprises a gap between the second surface and the third surface having a maximum distance of about 10 mm or less.

Aspect (38) of this disclosure pertains to the method of Aspect (37), wherein the maximum distance is about 5 mm or less.

Aspect (39) of this disclosure pertains to the method of Aspect (37), wherein the maximum distance is about 3 mm or less.

It will be apparent to those skilled in the art that various modifications and variations can be made without departing from the spirit or scope of the invention.

What is claimed is:

1. A glass article comprising a glass composition, the glass composition comprising:
   $SiO_2$ in an amount in a range from about 66 mol % to about 80 mol %;
   $Al_2O_3$ in an amount in a range from about 2 mol % to about 16 mol %;
   $B_2O_3$ in an amount in a range from about 0.9 mol % to about 15 mol %;
   $P_2O_5$ in an amount from about 1 mol % to about 6 mol %;
   $Li_2O$ in an amount from about 1 mol % to about 12 mol %; and
   $Na_2O$ in an amount from about 6 mol % to about 15 mol %.

2. The glass article of claim 1, wherein $SiO_2$ is present in an amount from about 70 mol % to about 80 mol %, and $Al_2O_3$ is present in an amount from about 7 mol % to about 15 mol %.

3. The glass article of claim 1, further comprising a total amount of $SiO_2$, $Al_2O_3$, $B_2O_3$, and $P_2O_5$ greater than about 88 mol %.

4. The glass article of claim 1, further comprising a compositional relationship (in mol %) of $0.9<(Al_2O_3+P_2O_5)/(Li_2O+Na_2O)<1.20$.

5. The glass article of claim 1, wherein the glass article is strengthened.

6. The glass article of claim 1, wherein the glass article is fusion formed.

7. A laminate comprising:
   a first glass layer;
   an interlayer disposed on the first glass layer; and
   a second glass layer disposed on the interlayer opposite the first glass layer,
   wherein either one or both the first glass layer and the second glass layer comprises a glass composition comprising:
   $SiO_2$ in an amount in a range from about 66 mol % to about 80 mol %;
   $Al_2O_3$ in an amount in a range from about 2 mol % to about 16 mol %;
   $B_2O_3$ in an amount in a range from about 0.9 mol % to about 15 mol %;
   $P_2O_5$ in an amount from about 1 mol % to about 6 mol %;
   $Li_2O$ in an amount from about 1 mol % to about 12 mol %; and
   $Na_2O$ in an amount from about 6 mol % to about 15 mol %.

8. The laminate of claim 7, wherein either one or both the first glass layer and the second glass layer comprise a thickness less than about 1.6 mm.

9. The laminate of claim 7, wherein the glass composition further comprises a compositional relationship (in mol %) of $0.9<(Al_2O_3+P_2O_5)/(Li_2O+Na_2O)<1.20$.

* * * * *

UNITED STATES PATENT AND TRADEMARK OFFICE
CERTIFICATE OF CORRECTION

PATENT NO. : 11,028,008 B2
APPLICATION NO. : 15/817958
DATED : June 8, 2021
INVENTOR(S) : Timothy Michael Gross et al.

It is certified that error appears in the above-identified patent and that said Letters Patent is hereby corrected as shown below:

In the Claims

In Column 40, Line 6, Claim 4, delete "<1.20" and insert -- $\leq 1.20$ --, therefor.

In Column 40, Line 20, Claim 7, delete "$Al_2O_3$in" and insert -- $Al_2O_3$ in --, therefor.

In Column 40, Line 34, Claim 9, delete "<1.20" and insert -- $\leq 1.20$ --, therefor.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*